United States Patent [19]

Tran et al.

[11] 4,333,847

[45] Jun. 8, 1982

[54] FIXATION BY ANION EXCHANGE OF TOXIC MATERIALS IN A GLASS MATRIX

[75] Inventors: Danh C. Tran, Rockville, Md.; Pedro B. Macedo, 6100 Highboro Dr., Bethesda, Md. 20034; Joseph H. Simmons; Catherine J. Simmons, both of Bethesda, Md.; Nicholas Lagakos, Silver Spring, Md.

[73] Assignees: P. B. Macedo, Bethesda; T. A. Litovitz, Silver Spring, both of Md.

[21] Appl. No.: 65,752

[22] Filed: Aug. 10, 1979

Related U.S. Application Data

[63] Continuation-in-part of Ser. No. 34,567, Apr. 30, 1979, which is a continuation-in-part of Ser. No. 959,220, Nov. 9, 1978, abandoned.

[51] Int. Cl.$^3$ .............................................. G21F 9/16
[52] U.S. Cl. ..................................... 252/629; 210/682; 250/493; 250/506; 252/179; 252/449; 252/454; 252/457; 264/0.5; 405/128; 252/632
[58] Field of Search ................. 252/301.1 W, 301.1 R, 252/179, 457, 454, 449; 250/493, 506, 507; 264/0.5; 65/18, 302; 405/128; 106/52; 210/38 B, 38 C, 682

[56] References Cited

U.S. PATENT DOCUMENTS

| 3,364,148 | 1/1968 | Kivel ..................................... 250/493 |
| 3,923,688 | 12/1975 | Hammel et al. ..................... 252/454 |
| 3,925,992 | 12/1975 | Backstrom .......................... 405/128 |
| 3,969,261 | 7/1976 | Meiller ................................ 252/179 |
| 3,971,717 | 7/1976 | Hild et al. ..................... 252/301.1 W |
| 4,056,112 | 11/1977 | Calmon ........................ 252/301.1 W |
| 4,118,316 | 10/1973 | Talley et al. ........................ 428/406 |
| 4,178,270 | 12/1979 | Fujita et al. ................. 252/301.1 W |

OTHER PUBLICATIONS

Mizutani et al., "Determination of Some Inorganic Cations . . . " J. Non–Cryst. Solids 30 (1978) pp. 23–27.
W. A. Patrick and E. H. Barclay, J. Phys. Chem., vol. 29, p. 1400.
L. V. Ponomareva et al., Zhurnal Prikladnoi Khimii, vol. 48, No. 10, pp. 2150–2155.
Amphlett et al., J. Inorg. Nucl. Chem., vol. 6, pp. 236–245 (1958).
The 1979–1980 Pierce Handbook & General Catalog, pp. 355–379.

*Primary Examiner*—Deborah L. Kyle
*Attorney, Agent, or Firm*—Fisher, Christen & Sabol

[57] ABSTRACT

This invention relates to the immobilization of toxic, e.g., radioactive materials, internally in a silicate glass or silica gel matrix for extremely long periods of time. Toxic materials, such as radioactive wastes containing radioactive anions, and in some cases cations, which may be in the form of liquids, or solids dissolved or dispersed in liquids or gases, are internally incorporated into a glass matrix, having hydrous organofunctionalsiloxy groups, e.g., hydrous aminoalkylsiloxy or carboxyorganosiloxy, bonded to silicon atoms of said glass and/or hydrous polyvalent metals bonded to silicon atoms of said glass through divalent oxygen linkages or otherwise immobilized therein, by a process which involves the ion exchange of said toxic, radioactive anions with hydroxyl groups attached to said organofunctionalsiloxy groups or with hydroxyl groups attached to the hydrous polyvalent metal. Thereafter, the resulting glass now characterized by a distribution of internally bonded or immobilized, toxic, radioactive anions can be packaged in suitable containers, and disposed of as by burial, and/or they can be sintered to collapse the pores thereof prior to disposal or for producing useful radiation sources. The porous glass or a porous silica gel having said silicon-bonded organofunctionalsiloxy groups and/or said hydrous polyvalent metal oxy groups, the pores of said glass or silica gel remaining open and uncollapsed, can be used advantageously as a backfill for an underground radioactive waste burial site and as overpack in the waste disposal container. Also included is a novel method for bonding the polyvalent metal to the porous silica glass or gel by substituting the protons of the silicon-bonded hydroxyl groups thereof with an alkali metal or ammonium cation followed by displacement of said cation with the non-radioactive polyvalent metal cation.

62 Claims, No Drawings

FIXATION BY ANION EXCHANGE OF TOXIC MATERIALS IN A GLASS MATRIX

RELATED APPLICATIONS

This application is a continuation-in-part of U.S. application Ser. No. 34,567, filed Apr. 30, 1979 which, in turn, is a continuation-in-part of U.S. application Ser. No. 959,220, filed Nov. 9, 1978 abandoned.

BACKGROUND OF THE INVENTION

Cooling, operational and waste water from the daily operation of nuclear power plants and fuel rod holding tanks is contaminated with a number of radioactive isotopes which are present in the water in very low concentrations but which nonetheless are highly radioactive and toxic to human life. Since the volumes of contaminated water are extremely large, it is neither possible nor economically feasible to store away this water permanently. Instead, the water must be either re-used or released back into the environment. Safe disposal or re-use of the contaminated water can only be conducted if a sufficient quantity of radioactive isotopes are removed from it to reach permissible levels. The method of ion exchange is the most promising and most in use today because of the large volume reduction of waste material.

The radioactive isotopes present in contaminated nuclear reactor water occur as cations, anions or solids, and any complete disposal system must handle all three species. Radioactive isotopes present in typical reactor cooling water are listed in Table 1. This water also generally contains non-radioactive isotopes of boron (400 ppm), sodium (150 ppm) and chlorine (5 ppm).

The most dangerous cations from the stand point of high concentrations and long-half lives are Cs, Co and Sr. These are removed with the other dissolved cations by a cation exchanger.

In copending applications U.S. Ser. No. 959,222 filed Nov. 9, 1978 and U.S. Ser. No. 39,595, filed May 16, 1979, each entitled Fixation By Ion Exchange of Toxic Materials In a Glass Matrix and each by C. J. Simmons, J. H. Simmons, P. B. Macedo, and T. A. Litovitz the removal of radioactive cations from reactor cooling systems using a porous glass cation exchanger is disclosed.

The anions present in solution consist primarily of $I^{131}$ which has a half-life of 8 days but which poses a significant threat to life due to its affinity for and high reconcentration in animal and human metabolic processes. Most other anion isotopes are also short-lived and due to this rapid decay, they have a stronger tendency to damage their ion-exchange hosts than do the cation isotopes. After 3 months, the majority of the non-metal anions have generally decayed to stable isotopes, however many of the longer-lived metal isotopes form anionic complexes such as chromates, cerates, and molybdates, which remain radioactive for longer time periods. For example, the half-lives of $Cr^{51}$, $Ce^{144}$, and $Te^{99}$ are 26 days, 290 days and 200,000 years respectively.

Today, organic anion resins are used in nuclear reactors, however, they are readily decomposed by radioactivity, they cannot be dried, they are not compatible for use in mixed beds with the new types of glass cation exchangers coming on the market, and they cannot be put into a long-term chemically stable form, thus causing a serious danger to the environment through premature release of the radioactive isotopes. The present invention is directed to the disposal of both poisonous radioactive anions such as radioactive iodide, chromate, molybdate, cerate and technetium, and non-poisonous or non-radioactive isotopes. The non-poisonous anions must be removed from nuclear waste streams to protect parts which are in contact with the streams. Exemplary parts are fuel elements, tubing, heat-exchangers, reactor vessels. Chloride is the predominant non-radioactive anion which must be removed.

The present invention discloses the use of an especially prepared porous glass medium as an anion exchanger. The glass anion exchanger is far superior to the organic exchangers available today for the following reasons. It is insensitive to radiation (such as from short-lived isotopes). It is compatible with the new glass cation exchangers and can be used in mixed-bed exchanger media with them. It can be dried, thus reducing the dissemination of radioactive isotopes after use. It can be heated to permanently fixate radioactive isotopes within its pores and produce a long-term chemically stable form which will resist premature dissemination of radioactive isotopes into the environment. Finally, as can be seen from Table 1, and Table 4, there are a large number of radioactive isotopes which occur as solids. These solids are dangerous and have long half-lives such as $Co^{60}$ with 5 years. These solids do not chemically bond to the ion exchange media, however they remain entrapped between the grains of the ion exchanger by simple filtering action. As a result, they are effectively removed from the water by the ion exchange media. If the media are organic resins, they are encased in cement or bitumen, neither of which have a good long-term chemical stability, and the filtered solids are the first to be released to the environment, thus causing a serious health hazard. If the media are the anion-exchanged glasses disclosed here, it is possible to heat them to moderate temperatures and cause sintering of the ion exchange powder, thus permanently fixating these toxic, radioactive solids in the glass structure and effectively isolating them from the environment.

TABLE 1

| Typical radioactive isotopes in reactor cooling water | | |
|---|---|---|
| | typical concentration $\mu Ci/ml$ | chemical form |
| γ-emitters | | |
| Co-57 | $1.3 \times 10^{-5}$ | cation, solid |
| Cr-51 | $3.5 \times 10^{-4}$ | anion |
| I-131 | $2.0 \times 10^{-4}$ | anion |
| Cs-134 | $1.1 \times 10^{-3}$ | cation |
| Cs-137 | $1.8 \times 10^{-3}$ | cation |
| Zr-95 | $7.1 \times 10^{-5}$ | solid |
| Nb-95 | $8.6 \times 10^{-5}$ | solid |
| Co-58 | $6.7 \times 10^{-3}$ | cation, solid |
| Fe-59 | $2.6 \times 10^{-4}$ | cation, solid |
| Ba—La-140 | $1.2 \times 10^{-5}$ | cation |
| Cs-136 | $3.1 \times 10^{-5}$ | cation |
| Mn-54 | $6.9 \times 10^{-4}$ | cation, solid |
| Co-60 | $3.5 \times 10^{-3}$ | cation, solid |
| Non γ-emitters | | |
| Sr-90 | | cation |
| Y-90 | | cation |
| H-3 | | cation, anion |
| C-14 | | cation, anion, solid |
| Other γ-emitter isotopes found in trace amounts | | |
| Np-239 | | cation |
| Ce-144 | | anion, solid |
| Ce-139 | | anion, solid |

TABLE 1-continued

Typical radioactive isotopes in reactor cooling water

| | typical concentration $\mu$Ci/ml | chemical form |
|---|---|---|
| Sn-113 | | anion |
| Zn-69M | | cation, solid |
| Co-138 | | cation |
| W-187 | | solid |
| I-133 | | anion |
| As-76 | | anion |
| Cs-134 | | cation |
| Nb-97 | | solid |
| Mo-99 | | anion |
| Zr-97 | | solid |
| I-132 | | anion |
| I-134 | | anion |
| Ag-110M | | solid |
| Zu-65 | | cation, solid |
| Na-22 | | cation |
| Cu-64 | | cation, anion, solid |
| Na-24 | | cation |
| K-40 | | cation |
| Ni-65 | | cation, solid |
| K-42 | | cation |
| Cl-38 | | anion |
| Mn-56 | | cation, solid |
| Rb-88 | | cation |
| I-135 | | anion |

The two most popular types of commercial reactors, both of which produce low level wastes, are the Boiling Water Reactor (B.W.R.) and the Pressurized Water Reactor (P.W.R.). In a typical Pressurized Water Reactor (P.W.R.), pressurized light water circulates through the reactor core (heat source) to an external heat sink (steam generator). In the steam generator, where primary and secondary fluids are separated by impervious surfaces to prevent contamination, heat is transferred from the pressurized primary coolant to secondary coolant water to form steam for driving turbines to generate electricity. In a typical Boiling Water Reactor (B.W.R.), light water circulates through the reactor core (heat source) where it boils to form steam that passes to an external heat sink (turbine and condenser). In both reactor types, the primary coolant from the heat sink is purified and recycled to the heat source.

The primary coolant and dissolved impurities are activated by neutron interactions. Materials enter the primary coolant through corrosion of the fuel elements, reactor vessel, piping, and equipment. Activation of these corrosion products adds radioactive nuclides to the primary coolant. Corrosion inhibitors, such as lithium, are added to the reactor water. A chemical shim, boron, is added to the primary coolant of most P.W.R.'s for reactivity control. These chemicals are activated and add radionuclides to the primary coolant. Fission products diffuse or leak from fuel elements and add nuclides to the primary coolant. Radioactive materials from all these sources are transported around the system and appear in other parts of the plant through leaks and vents as well as in the effluent streams from processes used to treat the primary coolant. Gaseous and liquid radioactive wastes (radwaste) are processed within the plant to reduce the radioactive nuclides that will be released to the atmosphere and to bodies of water under controlled and monitored conditions in accordance with federal regulations.

The principal methods or unit operations used in the treatment of liquid radwaste at nuclear power plants are filtration, ion exchange, and evaporation.

Liquid radwastes in a P.W.R. are generally segregated into five categories according to their physical and chemical properties as follows:

a. Clean Waste includes liquids which are primarily controlled releases and leaks from the primary coolant loop and associated equipment. These are liquids of low solids content which are treated in the reactor coolant treatment system.

b. Dirty or Miscellaneous Waste includes liquids which are collected fom the containment building, auxiliary building, and chemical laboratory; regeneration solutions from ion-exchange beds; and solutions of high electrical conductivity and high solids content from miscellaneous sources.

c. Steam Generator Blowdown Waste is condensate from the steam that is removed (blowdown) periodically to prevent excessive solids buildup.

d. Turbine Building Drain Waste is leakage from the secondary system that is collected in the turbine building floor sump.

e. Detergent Waste includes liquids from the laundry, personnel decontamination showers, and equipment decontamination.

Liquid radwastes in a B.W.R. are generally segregated into four categories according to their physical and chemical properties as follows:

a. High-Purity Waste includes liquids of low electrical conductivity (<50 $\mu$mho/cm) and low solids content, i.e., reactor coolant water that has leaked from the primary reactor system equipment, the drywell floor drain, condensate demineralizer backwash, and other sources of high-quality water.

b. Low-Purity Waste includes liquids of electrical conductivity in excess of 50 $\mu$mho/cm and generally less than 100 $\mu$mho/cm; i.e, primarily water from floor drains.

c. Chemical Waste includes solutions of caustic and sulfuric acid which are used to regenerate ion exchange resins as well as solutions from laboratory drains and equipment decontamination.

d. Detergent Waste includes liquids from the laundry and personnel decontamination showers.

The liquid radwastes from both types of reactors are highly dilute solutions of radioactive cations, anions and other dissolved radioactive materials as well as undissolved radioactive particles or finely divided solids.

A practical process for disposing of radioactive materials in a dry solids form having high resistance to leaching and other forms of chemical attack would not only be suitable for the disposal of radioactive nuclear wastes, but also for the fabrication of radioactive sources useful in industry, medicine, and in the laboratory.

Heretofore, there did not exist any practical foolproof means for the safe disposal, storage and immobilization of pernicious radioactive waste material. Present day storage containers do not provide sufficient isolation and immobilization of such radioactive material, sufficient long-term resistance to chemical attack by the surroundings, and sufficient stability at high temperatures.

Currently low level radioactive waste, that is radioactive waste generated at reactor sites, is disposed of in the following manner:

(A) The dead ion exchange resin containing radioactive waste is mixed with cement or bitumen and cast in forty gallon barrels.

(B) The bottoms from evaporators which contain the radioactive contaminated boric acid and the solutions used to regenerate the ion exchange columns are mixed with cement powder or bitumen and cast in forty gallon barrels.

(C) The filters containing particulate forms of radioactive waste are usually encased in cement or bitumen in barrels.

These cement or bitumen barrels are transported to low level radioactive waste sites and buried six to twenty feet deep in the ground. At least one of the sites is in the United States eastern states and exposed to substantial rainfall. In Europe, these barrels are buried at sea. In both cases water will first corrode the metal then the cement and will relatively quickly expose the radioactive ions for leaching into the ground water or sea water. Because the U.S. burials are only a few feet deep, the contaminated water can readily intermix with streams, lakes and rivers, thus, entering the ecosphere. The rationale for this practice is the assumption that upon sufficient dilution the radioactivity becomes harmless.

Some of the most serious nuclear wastes are cesium and strontium which are biologically similar to sodium and calcium. They have thirty year half-lives indicating that they should be isolated from the ecosphere for at least three hundred years (ten half-lives). At Bikini, the experts assumed that dilution had made the island inhabitable after decades in which no atomic explosions were performed, yet when the population was returned to the island its health was deleteriously effected. It has since been realized that plants and animal life biologically reconcentrate these radioactive elements back up to dangerous levels.

Thus, the "safe" concentration of radioactive waste must be much lower than accepted values and a more durable substitute for cement is needed. In one aspect, the present invention presents a safe alternative to the cement-solidification of low level waste.

U.S. Pat. No. 3,640,888 teaches the production of neutron sources by encapsulating californium-252 in glass using the steps of packing an open-ended vitreous tube with a porous powder of quartz having a organic liquid ion exchange material sorbed thereon, passing an aqueous solution containing californium-252 cation through the powdered quartz, drying and heating the powdered quartz and tube in air to oxidize and volatilize the organic liquid ion exchange material resulting in the non-volatile oxide of californium-252, and then fusing the tip and powder contents to form a vitreous body containing the californium-252 oxide. The patent, however, does not disclose, teach or suggest the use of porous glass or silica having aminoorganosilyloxy groups bonded to silicon and/or having hydrous metal oxides bonded to silicon through divalent oxygen linkages wherein hydroxyl groups are exchanges for radioactive anions in aqueous solution nor does it disclose or suggest any method or technique for concentrating and safely disposing of radioactive wastes.

As will be apparent hereinafter from the various aspects of applicants' contributions to the art, there are provided novel methods to obtain novel compositions and articles for the containment of pernicious and dangerous radioactive materials over extraordinarily long periods of time. Unlike melting glass containment procedures, the methods of the invention need not involve any steps which would expose radioactive material to high temperatures, e.g., above about 900° C., thereby eliminating the environmental hazard due to possible volatilization of radioactive material into the atmosphere.

Belgian Pat. No. 839,705, issued July 16, 1976 and German Offenlegungsschrift 2,611,495, published July 10, 1976 correspond substantially to U.S. Pat. No. 4,110,096, issued Aug. 29, 1978 to Pedro B. Macedo named as an inventor herein and Theodore A. Litovitz. These patents and Offenlegungsschrift contain essentially the same disclosures but there is no disclosure of porous glass forms having sufficient ion exchange capabilities to bind practical amounts of radioactive anions to the glass to thereby concentrate and contain said radioactive anions in the manner taught herein.

The presence of silica gel in the pores can be advantageous in this invention as providing more surface area and a higher proportion of silicon-bonded hydroxyl groups and ultimately higher amounts of organofunctionalsiloxy bonded hydroxyl groups or hydrated metal oxide groups for ion exchange with radioactive anions. U.S. Pat. No. 4,110,096 also discloses oxides or salts of heavy metals such as zirconium, lead, and thorium as dopants for the porous glass. The dopants are precipitated in the pores, the porous glass is washed in water or an acidic solution, dried and sintered. However, there is no teaching or suggestion of binding a hydrous metal oxide to silicon of a porous glass or porous silica gel through divalent oxygen linkages prior to heating to sintering temperatures and thereafter reacting the resulting product with radioactive or toxic anions.

In an article by Amphlett et al., entitled, "Synthetic Inorganic Ion-Exchange Materials-II Hydrous Zirconium Oxide And Other Oxides," J. Inorg. Nucl. Chem., Vol. 6, pp. 236 to 245 (1958), hydrous oxides, such as hydrous zirconium oxide, are disclosed as anion exchangers in acid and neutral solution and as cation exchangers in alkaline solution. The Amphlett et al. article is herein incorporated by reference in its entirety. There is no teaching or suggestion in the Amphlett et al. article of binding the hydrous metal oxide to the silicon atoms of a porous glass or porous silica gel through divalent oxygen linkages and reacting the resulting product with radioactive or toxic anions.

U.S. Pat. No. 2,943,059 discloses porous glass ion exchange glass for removal of the radioactive ions cesium and strontium: anions are not specifically mentioned. The glass composition must contain at least 10% titanium dioxide, zirconium dioxide, or hafnium dioxide and at least 20% $PO_{2.5}$ which combines in a unique manner with the above three oxides. The reference does not teach or render obvious a porous glass or silica gel having an $SiO_2$ content of at least 82% by weight ($SiO_2$ is an optional ingredient). The high silica content is needed in the present invention for obtaining a glass of high durability. Also, hydration of the hydrous metal oxide groups to form an anion exchange medium is not disclosed. Collapsing of the porous structure after ion exchange is not disclosed.

U.S. Pat. No. 3,843,341 teaches forming porous glass beads which may contain more than 96% by weight silica and impregnating them with various metal salts, including nitrates, followed by heat decomposing the metal salt to form the corresponding metal oxide, e.g., titanium dioxide and tin oxide. The porous products may contain greater than 96% by weight silica. The product is used as a catalyst and the hydrated form is not specified.

U.S. Pat. No. 3,923,688 teaches a high silica porous glass (at least 96% by weight SiO₂) which can be used as a catalyst support, a filter, a cation exchanger, or an anion exchanger. When used as a catalyst support, zirconium oxide, which apparently has a catalytic effect and/or imparts thermal stability to the catalyst, is deposited within the pores of the glass by decomposition of zirconium nitrate. A porous glass having hydrous zirconium oxide bonded thereto is not disclosed as an anion exchanger. Production of a cation exchanger, however, is disclosed wherein sodium ions are placed on the surface of the porous glass. Conversion of the glass to an anion exchanger by attaching hydrous metal oxides to the glass surface is not disclosed. Also, treatment of the porous glass with an organosilane is disclosed. The product is disclosed as being also useful as a support for chromatographic separations. However, anion exchangers having hydrated aminoorganosilyloxy groups at the surface of the porous glass are not disclosed. Furthermore, removal of radioactive ions from aqueous radwaste solutions are not disclosed and there is no mention of collapsing the pores of the glass.

U.S. Pat. No. 4,025,667 discloses porous glass having a coating of zirconium oxide thereon. The zirconium oxide coating may be silanized with an organofunctionalsilane coupling agent. The organofunctional portion of the silane coupling agent is used to immobilize enzymes. Removal of radioactive ions from radwastes is not disclosed. In addition, the pores of the porous glass are not subsequently collapsed. The reference does not teach hydrating the zirconium oxide coated glass to form an anion exchange medium having ion exchangeable hydroxyl groups attached to the zirconium ion.

U.S. Pat. No. 3,969,261 discloses ion exchangers comprising porous silica gel beads, or other porous silica supports having a tertiary aminoalkylsilane bonded to oxygen of the silica gel to produce ≡SiOSi≡ bonds. These ion exchangers are made by reacting a (dialkylamino)alkoxysilane with the hydroxyl groups of a silica gel which can also contain hydroxides of titanium, zirconium and thorium. Neither removal of radioactive ions from radwastes nor subsequent collapsing the pores is disclosed.

U.S. Pat. No. 4,118,316 discloses high silica porous glass beads of carefully controlled pore size which are reacted with an aminoalkylsilane, such as gamma-aminopropyltriethoxysilane. The resulting product is then quaternarized with a hydrocarbon halide or tertiary amine to introduce quaternary ammonium moieties on the beads. The quaternary ammonium moieties are used to separate cation polymers into molecular weight fractions. Hydration of the amino group of the aminoalkylsilane to produce anion exchange groups is not disclosed. Neither removal of radioactive ions nor subsequent collapsing of the pores of the porous glass is disclosed.

The 1979–80 Pierce Handbook & General Catalog, pages 355–379 discloses controlled pore porous glass supports for chromatography and more specifically discloses silylated aminoalkyl controlled pore glass supports for solid phase sequencing of large peptide fragments. This reference, however, fails to disclose, teach or suggest the removal of radioactive anions from aqueous radwaste solutions or subsequent collapsing of the porous structure.

U.S. Pat. No. 3,709,833 discloses porous silica glass forms which can contain zirconium oxide and which are primarily useful as catalyst supports. This patent does not disclose, teach or suggest that the porous silica glass forms disclosed therein can be used as anion exchangers nor does it disclose the removal of radioactive anions from aqueous radwaste solutions or the containerizing or burying of same underground or underwater or the collapsing of the pores containing the radioactive anions.

U.S. Pat. No. 2,614,135 discloses porous silica gels treated with aminoorganosilane to produce a product suitable for removing oil from oil-polluted waters.

U.S. Pat. No. 2,990,243 teaches the removal of fission products and/or plutonium from solutions by adsorbing the fission product and/or plutonium on a titanated silica gel.

U.S. Pat. No. 2,893,824 also teaches a titanated silica gel.

However, none of these references teach or suggest using a porous silica gel having an interconnected porous structure and having organofunctionalsiloxy groups bonded to silicon of the silica gel and/or hydrous polyvalent metal oxide groups bonded to silicon of the silica gel through divalent oxygen linkages as a backfill for nuclear waste disposal sites.

None of the afore-mentioned prior art references disclose, teach or suggest the removal of radioactive anions from an aqueous radwaste through the use of a silica gel or a porous silica glass containing at least 82 mol percent silica and having hydrated organofunctionalsiloxy groups bonded to silicon of the glass or gel and/or a hydrated polyvalent metal oxide bonded to silicon of the glass or gel or deposited within the pores thereof. These references fail to disclose or suggest the containerizing and burial underground or underwater of the containerized silica gel or porous glass impregnated with radioactive anions internally bonded therein. The references also fail to disclose or suggest collapsing of the pores of the silica gel or porous glass to encase the radioactive anions therein to provide articles useful as radiation sources or suitable for burial. Furthermore, the references fail to disclose, teach or suggest the use of silica gel or porous glass containing the hydrated organofunctionalsiloxy groups and/or hydrated polyvalent metal oxides as backfill for stored nuclear waste materials. In addition, there is no disclosure or suggestion in any of these references of the ionic bonding of polyvalent metal oxides to porous silica glass or silica gel by first exchanging the protons of the silicon-bonded hydroxyls with an alkali metal, e.g., sodium, or ammonium, cations followed by replacement of the alkali metal or ammonium cations with the polyvalent metal cations.

SUMMARY OF THE INVENTION

The invention relates to the concentration of toxic, e.g., radioactive anions, such as chromate or molybdate anions, and/or corrosive anions, such as, Cl⁻, and the like and immobilization of same for extremely long periods of time.

This invention is based in part on the preparation of an ion exchange medium which is a porous silica glass or silica gel, having a large internal surface area which is modified with hydrous polyvalent metal oxides and/or organofunctionalsiloxy groups, so as to provide the capability of ionically bonding to said surface area radioactive ions that contact same.

As used in the specification and claims, the term "hydrous polyvalent metal" means metal cations having a valence of at least two, whose oxides can be hydrated and which, in the hydrated form, exhibit anion exchange capabilities by removal of hydroxyl groups (—OH) bonded to the polyvalent metal cation.

This invention also contemplates passing of a liquid stream to be purified through a bed of porous silicate glass anion exchange medium having interconnected pores and having hydrous organofunctionalsiloxy groups, preferably cationic in nature, e.g., aminoalkylsiloxy groups, and/or having hydrous polyvalent metal oxides bonded to silicon atoms of the porous glass through divalent oxygen linkages. Corrosive, toxic, poisonous, and/or radioactive anions of the liquid undergo an anion exchange reaction with said porous glass anion exchange medium whereby hydroxyl groups of the hydrated hydrous polyvalent metal oxide groups or hydroxyl groups bonded to the functional groups of said organofunctionalsiloxy groups are replaced by said corrosive, toxic, poisonous, and/or radioactive anions. When the organofunctionalsiloxy groups are cationic, e.g., carboxyorganosiloxy groups, radioactive cations in the liquid are removed. Some of the radioactive anions likely to be found in nuclear plant coolants are those containing radioactive iodide, chromium, molybdenum, and technetium. Non-radioactive, non-poisonous anions which corrode or foul processing equipment, such as chloride, sulphate, and nitrate, are also removed by the ion exchangers of the present invention. The resulting porous glass containing the radioactive anions and/or cations is then containerized in concrete or bitumen and disposed or underground or underwater.

The resulting porous glass containing said radioactive anions and/or cations can then be heated to collapse the pores, if desired. The resulting collapsed product: (a) can be used as a radioactive source for sewage treatment or for medical and laboratory equipment or, (b) can be stored, containerized and/or disposed of by underground burial or burial at sea.

In another aspect of the present invention, the porous, non-radioactive silicate glass and/or silica gel anion exchange medium is used alone or in combination with a porous glass or porous silica gel cation exchange medium as described herein and/or in the copending application Ser. No. 959,222, filed Nov. 9, 1978, now abandoned, and 39,595, filed May 16, 1979, as a backfill for underground nuclear waste disposal sites to protect against attack by water that may enter the site as by seepage or flood, and as an overpack within cannisters to protect the radwaste solids against attack by water.

DETAILED DESCRIPTION OF THE INVENTION

The novel methods of this invention for removing radioactive ions from media (usually an aqueous solution) containing them involves contacting said media with an ion exchange porous silica glass or silica gel which has bonded to the silicon of the inner surfaces of the pores thereof or otherwise immobilized therein non-radioactive hydrated organofunctional siloxy groups, preferably hydroxyl ammonium organosiloxy groups, e.g., hydroxyl ammonium alkylenesiloxy groups of the formula:

formula: 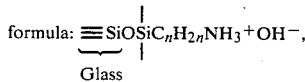

and/or carboxyorganosiloxy groups, e.g., carboxyalkylenecarbonylaminoalkylenesiloxy groups, e.g.,

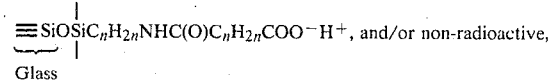, and/or non-radioactive, hydroxyl polyvalent metal groups, e.g., 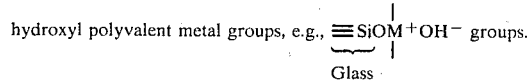 groups.

In the above formulas, n is an integer of 1 to 18, preferably 3 to 8; the remaining two valences of the silicon atom to which the $-C_nH_{2n}-$ group is bonded are joined to a hydrocarbon radical, and/or through oxygen to silicon of the glass, and/or to another $-C_nH_{2n}NH_3-OH^-$ group in the case of the hydroxyl ammonium alkylenesiloxy groups or another $-C_nH_{2n}NHC_nH_{2n}COO^-H^+$ of the carboxyalkylenecarbonylaminoalkylenesiloxy groups; M is a polyvalent metal having a valence of 2 to 5, preferably 3 or 4, and most preferably is a tetravalent metal as shown in the formula, e.g., zirconium; and the remaining valences of M, not bonded to the $\equiv SiO-$ or $OH^-$ groups as shown, are bonded ionically to $OH^-$ groups and/or through oxygen to silicon of the glass, or through oxygen to other M atoms. The pH of the radioactive aqueous solution being treated with the ion exchange porous glass or silica gel can range from about 4 to about 10, preferably from about 6 to about 8, for the hydroxyl ammonium organosiloxy group containing porous glass or silica gel, from about 4 to about 12, preferably about 6 to about 10, for the carboxyalkylenecarbonylaminoalkylenesiloxy group containing porous glass or silica gel; and from about 4 to about 10, preferably about 6 to about 8, for the hydroxyl polyvalent metal oxy group containing porous glass or silica gel. The radioactive aqueous solution, e.g., a coolant stream, contains radioactive anions and cations. The non-radioactive hydroxyl anions of the above-described group bonded on the surfaces of the porous glass or silica gel, in particular, those bonded to the inner surfaces of the myriad of interconnecting pores, are displaced by the radioactive anions of the radioactive aqueous solution forming such groups as $\equiv SiOSiC_nH_{2n}NH_3^+I^-$, and/or $\equiv SiOM^+I^-$, (using radioactive iodine anion as an example). In the case of carboxyorganosiloxy groups, bonded to the inner surfaces of the myriad pores of the porous glass or silica gel, the non-radioactive carbonyloxy-bonded protons are displaced by radioactive cations of the radioactive aqueous solution forming such groups as $\equiv SiOSiC_nH_{2n}NHC(O)C_nH_2COO^-Cs^+$ (using radioactive cesium cation as an example). Thus, the radioactive anions and/or cations are chemically bonded to silicon of the glass or silica gel through ammonium alkylenesiloxy linkages, or metal oxy linkages in the case of anions and oxycarbonylalkylenecarbonylaminoalkylenesiloxy linkages in the case of cations.

The invention is especially suitable for "decontaminating" radioactive waste streams which contain minute but dangerous levels of anionic as well as cationic radioactive species therein, especially radioactive streams such as the radioactive primary coolant water of the boiling water reactor system, the radioactive secondary coolant water (which drives the turbine) in the pressurized water reactor system, and generally the liquid radwastes exemplified previously which accumulate during the operation of such systems, by contacting the ion exchange porous glass described herein with such streams thus chemically binding radioactive anionic species through ammonium organosiloxy groups or metal oxy groups, and binding radioactive cationic species through oxycarbonyloxyganosiloxy groups, to the Si of the glass. The preferred methods contemplated by the practice of the invention utilize the ion exchange silicate glass described herein rather than a silica gel since much lesser amounts of silica dissolve into the coolant water system from the glass than from the gel. This can be of special importance since the (primary and secondary) coolant waters are contained in a closed circulating system and a build-up of silica in these coolant waters is not desirable. (When liquid radwaste is to be discarded as in a river, the silica build-up does not appear to be a problem.) In addition, flowrates through a porous silicate glass are considerably higher than through a porous silica gel. However, the ion exchange silica gels can be more advantageous for use as backfilling materials pursuant to this invention.

The ion exchange porous silica glass or gel can be made and used in the shape of various preforms, such as the small, short rods or small spheres or powders, or other particulate forms can be employed to remove radioactive anions or cations from highly dilute solutions of same by the present invention. For example, solutions containing as little as 1 ppt (parts per trillion) based on weight, i.e., 1 wt. part, radioactive anions or cations can be purified by contacting such solutions with the porous glass preforms in the manner described herein. This contact can take place in an ion exchange column packed with the ion exchange porous silicate glass preforms and the radioactive anion and cation-containing solution and stirred therein for a period of time that permits the maximum exchange of the radioactive anions of the solution for the non-radioactive hydroxyl anion attached to the silicon-bonded organofunctionalsilyloxy group or metal oxy groups and/or of the radioactive cations of the solution for the non-radioactive proton attached to the oxycarbonyl group of the carboxyalkylsiloxy group. Dilute solutions having less than 0.001 microcurie radioactivity per ml as well as more concentrated solutions, e.g., those having as high as 1 millicurie or more radioactivity per ml are efficiently treated by this invention.

Radioactive materials which can be chemically bound or fixed in the porous ion exchange glass or silica gel matrix according to this invention include radioactive elements (naturally occuring isotopes and manmade isotopes and exisiting as liquids or solids dissolved or dispersed in liquids or gases), in the form of the anion, such as radioactive chromate, molybdate, technetium, iodide ($I^{131}$) and in the form of negatively charged complexes containing radioactive metals such as iron. Especially suitable in the practice of the invention are radioactive wastes from nuclear reactors, spent reactor fuel reprocessing plants, spent fuel storage pools or other radioactive waste producing processes. Non-radioactive, corrosive anions which can be removed from waste streams such as these, or from other process streams by chemical bonding or fixation in the glass matrix include chloride, nitrate, and sulphate ions. The radioactive cations that can be removed by the carboxyalkylsiloxy modified porous silica glass or gel are those listed in the above-identified copending application, Ser. Nos. 959,222 and 39,595.

In a typical nuclear reactor there are several sources of radwaste as described hereinabove that must be safely contained. These include highly dilute liquid waste streams which can contain dispersed radioactive solids as well as dissolved radioactive anions, concentrated liquid wastes which can contain radioactive cations, radioactive anions and radioactive solids (such wastes are the result of the boiling down of primary coolant containing boric acid as a chemical shim and the boiling down of used regeneration solutions from the regular ion exchange beds customarily used); and/or radioactive gases such as radioactive krypton and/or radioactive iodine. Therefore, one use of our invention is in the provision of a total radwaste disposal system wherein the porous ion exchange glass having interconnected pores and organofunctionalsiloxy groups bonded to silicon of the glass and/or having hydrous metal oxides bonded to silicon of the glass through divalent oxygen linkages is packed into an anion exchange column which preferably is a fusible glass column. It is preferred that the porous ion exchange glass be finely divided and sieved to a suitable size to maximize the rate of flow of the radwaste stream through and between the particles of the porous ion exchange glass and to also minimize the ion exchange time. First, the dilute radwaste stream is passed through the column and the radioactive anions in solution are anion exchanged with the hydroxyl groups of the silicon-bonded organofunctionalsiloxy groups and/or hydroxyl groups of the silicon-bonded hydrous metal oxide groups in the porous glass to chemically bond the radioactive anions to the glass.

The liquid radwaste stream can also be contacted with a porous cation exchange glass such as those disclosed in the above-mentioned copending applications, Ser. Nos. 959,222 and 39,595 and/or the porous carboxyorganosiloxy glasses described herein. The contact with the porous cation exchange glass can be carried out in different beds of the same column that contains the porous anion exchange glass or in a separate column. If the dilute radwaste stream is to be re-used as primary coolant, it is conventional to add lithium ions as a corrosion inhibitor. Therefore, it can be advantageous to also utilize a porous cation exchange glass having silicon-bonded lithium oxy groups, preferably in a separate column or bed, so that lithium ions (which do not become radioactive as do sodium ions) are released to the coolant stream as radioactive cations are removed from it.

Additionally, dispersed radioactive solids in the dilute radwaste stream can be mechanically filtered onto the porous anion and/or cation exchange glass particles in the column or columns as the stream percolates through and between the particles. In order to maintain the ratios of solids in the radwaste stream to the porous ion exchange glass small enough to maintain the filtering action as the solids accumulate on the porous ion exchange glass particles, fresh porous ion exchange glass particles can be added to the column or columns, from time to time or the bed can be up-flowed.

After the column has been exhausted of its ion exchange capacity by the dilute liquid radwaste stream, it can be dried and, if desired and available, a concentrated liquid radwaste (containing concentrated boric acid, for example, at a temperature of 100° C.) can be added to the column. Thus, the pores of the porous ion exchange glass can be further stuffed with the radioactive solids, cations and anions contained by the concentrated radwaste. The particles can be dried to deposit the radioactive solids, cations and anions within the pores of the porous glass using techniques taught in U.S. Pat. No. 4,110,096. Thereafter, the column can be evacuated and radioactive gases can be introduced and together they are heated to collapse the pores of the loaded porous ion exchange glass and to collapse the glass column thereby immobilizing and containing the exchanged radioactive anions, the radioactive solids on the exterior of the porous glass particles, the radioactive solids, anions and/or cations deposited in the pores of the porous glass and the radioactive gas contained by the glass column. Suitable pressure differentials can be used to facilitate the collapsing of the glass column. Heating can be continued to cause the porous glass particles to stick to each other to further trap interstitial radioactive solids between the particles. Upon cooling there results a highly durable solid which effectively contains the radioactive waste introduced into the glass column.

Some of the nuclear reactor streams may be acidic because some elements in the radwaste appear as cations, e.g., rubidium, strontium, the lanthanides, and actinides cations, which, of course, have to be immobilized also. One way to accomplish this is to pass the acidic radwaste stream through a porous glass cation exchange column, collapsing the pores, and disposing of the collapsed product all as described in said copending applications Ser. Nos. 39,595 and 959,222.

This invention can be employed for concentrating and immobilizing radioactive anions and/or cations in a glass for extremely long time storage. When applicable, silicate glass loaded with radioactive anions bonded to silicon through organofunctional-siloxy linkages or through hydrous polyvalent metal oxy linkages, and/or cations bonded to silicon of the glass or gel through oxycarbonylorganosiloxy groups, can be appropriately packaged in containers, e.g., steel, concrete, urea-formaldehyde formulations, bitumen, etc., and buried beneath the earth's surface or dumped into the ocean. Alternatively, the radioactivity of the sintered glass containing the bonded radioactive anions can be utilized in suitable devices or instruments for a variety of purposes, such as, destroying microorganisms, e.g., in the preservation of food, or in sterilizing sewage sludge or for any other purpose where radioactivity can be employed constructively.

The typical concentrations of radioactive anions and cations in a typical reactor cooling water are given in Table 1 hereinabove. A typical PWR coolant water includes the following non-radioactive materials:

TABLE 2

| | |
|---|---|
| Boron | up to 4000 ppm* |
| Lithium as $^7$Li, ppm | 0.2 to 6 ppm |
| Total silica as $SiO_2$ | 200 ppb** (max) |
| Chlorides as $Cl^-$ | 0.2 ppm (max) |
| Hydrogen as $H_2$, Std cc/Kg $H_2O$ | 20–40 |
| Total Dissolved Gases, Std cc/Kg $H_2O$ | 100 |
| Total suspended solids | 1 ppm (max) |

*ppm = parts per million
**ppb = parts per billion

Advantages of the present invention include the fact that conventional organic ion-exchange resins used in PWR and BWR systems to "decontaminate" coolant water and radwaste streams decompose or lose their stability during operation especially when the resin acquires or is exposed to radiation of certain levels of intensity, e.g., $10^8$ rad. Such decomposition or loss of stability is not manifest in the utilization of the ion exchange porous silicate glasses or silica gels described herein. Additionally, it has been observed that one unit volume of said porous ion exchange glass or gel can "concentrate" the radioactive ionic species contained in upwards of thousands, possibly millions of unit volumes of BWR coolant and/or PWR coolant and/or liquid radwaste on a calculated basis. With molecular stuffing techniques wherein maximum concentration is manifest by merely introducing and causing precipitation of ionic species from two or perhaps three unit volumes of liquid radwaste per unit volume of said glass. Also, the ionic exchange porous glass or gel in particulate form, e.g., bead, powder, flakes, etc., conveniently containerized, for example, in a column is highly efficient inasmuch as it allows much greater throughputs of PWR coolant, BWR coolant, and/or liquid radwaste which contacts a greater surface area of glass than is the case when utilizing comparably dimensioned organic ionic exchange resin columns.

Silicate glass as formed by the phase-separation and acid leaching process as described more fully hereinafter contains large amounts of silicon-bonded hydroxyl groups and so does silica gel. These hydroxyl groups exchange readily with other anions only under highly acidic conditions. Because of this, it is difficult or impractical to utilize such glasses to process most types of radioactive wastes especially those of the type that decompose, precipitate or are otherwise adversely affected by acidic agents.

Furthermore, in most cases, radioactive wastes, such as those resulting from reactor operation are highly dilute aqueous solutions. The adjustment of such solutions to a low enough pH to provide effective ion exchange with silicon-bonded hydroxyl groups of the glass requires the addition of large amounts of an acidic substance and, in those cases where the reclaimed water is to be recycled back to the reactor, the pH needs to be subsequently raised again which requires the addition of large amounts of alkaline materials. Thus, ion exchange treatment techniques utilizing porous silicate glass or silica gel containing silicon-bonded hydroxyl groups and no other ion exchange groups is at best uneconomical and impractical. In contrast, it has been unexpectedly found that, when the protons of the silicon-bonded hydroxyl groups are replaced with hydroxyl ammonium organosiloxy groups and/or hydrous polyvalent metal oxide groups, the radioactive anions readily exchange with the hydroxyl groups of the hydroxyl ammonium organosiloxy groups and/or the hydroxyl groups of the hydrated metal oxide groups at acid, neutral or moderately alkaline pH. Thus, it is unnecessary to adjust the pH of the radioactive material being impregnated into the pores of the porous ion exchange silicate glass or silica gel. In a similar manner, the carboxyorganosiloxy porous glass or silica gel can be used to remove radioactive cations from radioactive solutions without special pH adjustments.

It has also been unexpectedly found that radioactive anions can be substantially completely removed from very dilute solutions or dispersions thereof in water. For example, water containing radioactive anions can be purified down to a few parts per billion of radioactive anions by treatment with porous silicate glass having the above-described hydroxyl-containing groups bonded to silicon linkages. It has also been unexpectedly found that the impregnation of porous ion exchange silicate glass requires a relatively short period of time for effecting reasonably extensive ion exchange.

The porous ion exchange silica glass or gel loaded with ionicly bound radioactive anions and/or cations resulting from the present invention, can be stored, or packaged or "containerized" in suitable containers or forms, i.e., in concrete, metal, or plastic containers or disposed of as by underground burial or by burial at sea, and/or the pores thereof can be collapsed by heating thereby fixing and/or mechanically encapsulating the radioactive anions within a resultant chemically inert, non-porous glass product.

When heating to collapse the pores, the impregnated porous glass can be first dried to remove liquid, such as any solvents and/or volatile materials (water) in the pores and/or it can be washed to remove any solvents or unreacted materials residing within the pores or on the surface of the glass followed by drying to remove the washing solvent. The temperature used for drying can be between 50° C. and 200° C. and higher and lower temperatures can be used. The sintering or pore collapsing temperature used depends upon the glass composition and usually falls into the range of about 800° C. to about 1000° C. although higher or lower temperatures can be used depending upon the particular glass composition.

The sintered silicate glass or silica gel compositions or articles of this invention have high chemical durability to aqueous corrosion and have sufficiently low radioisotope diffusion coefficient values to provide protection of the environment from the release of radioactive material such as radioactive isotopes, nuclear waste materials, etc., which are chemically bound and/or physically encapsulated or entrapped therein. Such glass or silica gel compositions are characterized by at least 82 mol percent of $SiO_2$. The glass compositions containing the radioactive anions or cations according to this invention are characterized by a radiation activity illustratively above one millicurie, preferably greater than one curie, per cubic centimeter of said compositions.

When highly dilute radwastes are treated with the porous silicate glass or silica gel pursuant to this invention for the purpose of concentrating and immobilizing the radwaste for storage, the radiation activity of the resulting loaded porous silicate glass may not reach the level of one millicurie per cubic centimeter of the porous silicate glass and may remain below 1 microcurie per cc., when it becomes expedient for other reasons to store, or package in suitable containers, or dispose of as by burial, and/or to collapse the pores of the glass. In concentrating and immobilizing radioactive anions in dilute radwastes, the porous silicate glass can be loaded up to 10 microcuries per cc. or more but usually is loaded up to 1 microcurie per cc. of said porous glass.

The radioactive material is typically in the form of radioactive anions that: (a) are ionically bonded to the nitrogen atoms of hydrated aminoalkylsiloxy groups which, in turn, are bonded to the silicon atoms of the porous glass, as illustrated by the formula:

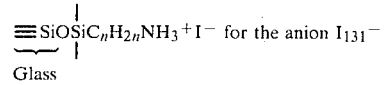

or (b) have replaced hydroxyl groups of a silicon-bonded hydrated hydrous polyvalent metal oxide, i.e., are ionically bonded to the polyvalent metal as illustrated by the formulas:

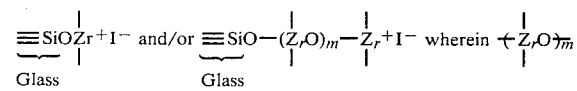

represents a crystal of zirconia deposited within the pores of the silica glass or gel and m is an integer. In the case of carboxyalkylenecarbonylaminoalkylenesiloxy groups bonded to silicon of the porous glass or silica gel, radioactive cations become bonded ionically to the carbonyloxy group as illustrated by the formula:

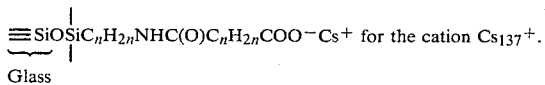

In one aspect, the amount of radioactive material contained in the resulting radioactively loaded glass composition is at least 1 ppb (part per billion based on weight). In the practice of the novel methods whereby liquid radwaste is "decontaminated", a plurality, of the radioactive species listed herein become bonded to the silicon of the glass through organosiloxy groups or metal oxy groups. The porous silica glass and gel compositions should contain at least 82 mol percent $SiO_2$, most preferably greater than 89 mol percent $SiO_2$, each on a dry basis, to: (a) provide high chemical durability to aqueous corrosion, and (b) provide low radioisotope diffusion coefficient values. Some of the organofunctionalsiloxy groups, e.g., hydroxyl ammoniumorganosiloxy groups or carboxyorganosiloxy groups, or hydroxyl polyvalent metal groups can be bonded through oxy groups to boron of the silica glass. After ion exchange with radioactive ions, therefore, some of the radioactive ions are ionically bonded to boron of the glass through the above-mentioned groups. In some cases, a large proportion of the polyvalent metal oxide is simply deposited within the pores of the silica glass or gel with little, if any, bonding of the polyvalent metal by oxy linkages to silicon of the glass or gel. It is believed that, based on current observations, at least some of the polyvalent metal atoms are joined to silicon by oxy linkages in most cases.

From a practical standpoint, the upper limit of radioactive material contained in the silicate glass or silica gel composition will be governed, to a degree, by such factors as: the $SiO_2$ concentration in the composition, by the concentration and type of other ingredients which may be present in the composition such as $B_2O_3$, $Al_2O_3$, $TiO_2$, $P_2O_5$, zirconia, thorium oxide, lead oxide, alkali metal oxides and $GeO_2$, and/or other network formers, by the type of radioactive material, by the volume fraction of the porous glass or silica gel precursor, by the various techniques employed to fix and/or encapsulate the radioactive material in the composition and other factors. A typical range of radioactive anion content (or cation content in the case of the carboxyalkylsiloxy-containing silica glass or gel) is about 1 ppb to about 20,000 ppm, preferably about 10 ppb to about 1000 ppm, in the porous glass.

In one embodiment of this invention, the silicate glass containing the radioactive anions bonded to silicon pursuant to this invention can be further contained within a collapsed glass article of a variety of shapes or forms, e.g., glass tube, having enhanced containment properties and characterized by an outer glass clad whose composition is at least about 90 mol percent silica, preferably greater than about 95 mol percent, and whose inner core contains the radioactive materials. The high silica content of the glass clad imparts to the articles a considerably greater chemical durability and resistance to leaching by ground waters. The inner core has a lower silica concentration of the order of at least about 70 mol percent silica, preferably about 82 mol percent, and most preferably about 89 mol percent, based on dry weights. The pores of the inner core can also be collapsed, if desired. In this embodiment the porous ion exchange silica glass or gel loaded with ionically bound radioactive anions and/or cations resulting from the methods of the present invention, are placed, before or after drying and/or pore collapse, within a fusible glass tube or container, preferably made of high silica glass. In the case, mentioned hereinbefore, wherein the porous ion exchange silica glass or gel forms are contained within a fusible glass tube thereby forming an ion exchange column, the resulting loaded column after ion exchange can be heated as is to first dry, then collapse the pores of said forms and then collapse the tube. In either case, the outer fusible glass tube or container is collapsed around the core of loaded glass or silica gel preforms by heating to a sufficiently high temperature, e.g., 1200° C. or lower to 1500° C. or higher. Various techniques such as applying vacuum or pressure to facilitate collapse of the tube or container can be used as are disclosed in copending application Ser. No. 959,220, filed Nov. 9, 1978 by Macedo et al, and the continuation-in-part application, Ser. No. 34,567, the disclosures of which are incorporated herein by reference.

The porous ion exchange silicate glass or gel having interconnected pores and having organofunctional-siloxy groups bonded to silicon of the glass or gel and/or having hydrous polyvalent metal oxides bonded to silicon of the glass or gel through divalent oxygen linkages can be used as a backfill for underground radioactive waste disposal sites and as an overpack material in the cannister, both to prevent or retard the dissemination of radioactive materials into the environment. The porous cation exchange silica glasses or gels of copending application Ser. Nos. 959,222, filed Nov. 9, 1978 now abandoned and 39,595, filed May 16, 1979 can also be used mixed with the porous anion exchange glasses or gels described herein or can be used in separate sections of the backfill area. In burying radioactive nuclear waste, particularly high level nuclear waste, typically a mine or mine shaft are dug which are large enough for people and equipment to transport and bury the nuclear waste containers in the mine. Once the nuclear waste cylinders, such as high level nuclear waste glass cylinders, or other solidified nuclear waste system are in position in the mine, the mine and mine shaft are closed up by backfilling. Bentonite has been reported to serve as a good backfill material because it can act as an ion exchanger which can slow down the diffusion of ions from the nuclear waste container caused by the penetration of water into the material container. However, bentonite only acts as an ion exchanger for cations.

Overpak material is placed either adjacent to the high-level radioactive waste solids inside the cannister or inside a second cannister which encloses the first cannister containing the radwaste solid. The overpack material can be disposed in the first or the second cannister or both and serves the same functions as the backfill by acting as a buffering material, a source of silica and an ion exchange material for the radioactive isotopes as described. Therefore, the word "backfill" throughout this description refers both generally to the overpack material and backfill material.

The porous glass or silica gel having interconnected pores and aminoorganosiloxy groups bonded to silicon and/or having hydrous metal oxides bonded to silicon through divalent oxygen linkages act as anion exchangers and can also act as cation exchangers. The hydroxyl groups bonded to the organofunctionalsiloxy groups and/or metal oxy groups ion exchange with the radioactive anions. However, unreacted silicon-bonded hydroxyl groups of the glass will serve as cation exchangers by exchanging the hydrogen atom of the hydroxyl group for the radioactive cation. The proportion of silicon bonded hydroxyl groups of the organofunctionalsiloxy groups and/or metal oxy groups in the glass can be controlled as described above. Furthermore, as disclosed in the above-mentioned article by Amphlett et al insolule hydrous oxides such as zirconium oxide, thorium oxide, and titanium oxide behave as anion exchangers in acid and neutral solution and cation exchangers in alkaline solution. In addition, to achieve both cation and anion exchange capacity: porous glass or silica gel cation exchangers such as disclosed in copending U.S. application Ser. No. 959,222 and copending U.S. application Ser. No. 39,595 can be used as a backfill with the porous glass or silica gel anion exchangers having organofunctionalsiloxy groups and/or hydrous metal oxy groups. Additionally, porous glass or porous silica gel having an interconnected porous structure and having substantially only hydroxyl groups bonded to the surface silicon atoms can be used as a backfill.

The use of a porous ion exchange silicate glass or silica gel as a backfill for nuclear waste disposal sites has the advantage over backfilling with dirt or bentonite of impeding the attack of the nuclear waste containers by water. First, if the porous glass or porous silica gel is originally backfilled into the mine in a very dry state, it will swell when contacted by water flowing towards the nuclear waste containers thereby closing up any holes or passage ways through the porous glass backfill. Second, as water percolates through the porous glass or silica gel, the silica will dissolve and form a saturated solution. Therefore, if the water penetrates through the backfill and contacts the radioactive nuclear waste glass: the dissolution rate of the radioactive nuclear waste glass would be very slow, if at all. The radioactive nuclear waste glass may be at a slightly higher temperature than the backfill. The higher glass temperature would heat the in-flowing water rendering it slightly unsaturated. The nuclear waste glass could then dissolve in the unsaturated solution but its dissolution rate would be very significantly lower than with a dirt or bentonite backfill. Of course, if the water flow was so great as to result in an unsaturated solution, the nuclear waste glass would be attacked even if its temperature were the same or lower than the temperature of the backfill porous glass or porous silica gel. However, as discussed above, once the nuclear waste glass or silica gel is attacked and dissolved: the radioactive anions and/or cations being leached from it would be ion exchanged with the porous silica glass or silica gel. Thus, there would be a major delay between the dissolution of the nuclear waste glass and the motion of ions out of the burial site. Furthermore, because the porous glass or porous silica gel can act as both a cation and anion exchanger it will buffer the water to a neutral pH thereby minimizing the dissolution rate of the glass.

The ability to trap radioactive anions migrating from the nuclear waste mine is very important. Technetium is the most serious long term problem in radioactive nuclear waste disposal sites because of its very long half-life (over 200,000 years). However, backfilling with a porous anion exchange silicate glass or silica gel having an interconnected porous structure and having organofunctionalsiloxy groups and/or hydrous metal oxide groups bonded to silicon of the porous glass or silica gel impedes the migration of technetium anions from the waste site by anion exchanging the radioactive technetium for the non-radioactive hydroxyl groups of the organofunctionalsiloxy groups and/or hydrous metal oxide groups.

The lower liquid flow rates through porous ion exchange silica gels, discussed above, are advantageous in backfilling applications even though they are less advantageous than the porous glasses in the treatment of a nuclear waste process stream. The lower flow rates obtained with the porous silica serve to slow down the attack by water flowing toward the buried nuclear waste and also slow down the outward flow of water which has penetrated and attacked the nuclear waste. Porous silica gels are commercially available and can be modified to have anion exchange properties as described above in connection with the porous silicate glass anion exchange media. The literature adequately describes the preparation of the porous silicate glass compositions. Suitable glass compositions which may be utilized in the novel methods generally contain $SiO_2$ as a major component, have a large surface area and have large amounts of silicon-bonded hydroxyl groups on their surfaces. In the practice of various embodiments of the invention the $SiO_2$ content of the porous glass or silica gel is at least about 82 mol percent $SiO_2$, preferably at least about 89 mol percent $SiO_2$. Such glasses are described in the literature, see U.S. Pat. Nos. 2,106,744; 2,215,036; 2,221,709; 2,272,342; 2,326,059; 2,336,227; 2,340,013; 4,110,093 and 4,110,096, for example. The disclosures of the last two mentioned patents are incorporated hereby be reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali-borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. We prefer to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the pores thus increasing the number of silicon-bonded hydroxyl surface groups present. The porous silicate glass may be in the shape of a suitable geometric or non-geometric container such as a cylinder, or it may be in particulate form such as powder, beads, spheroid, etc., desirably contained in a suitable container or conforming to the shape of the container such as a column, nylon bag, cube, plate-like membrane, cylinder, sphere, etc., and thereafter (or prior thereto) treated so that the protons of the silicon-bonded hydroxyl groups are replaced with hydroxyl ammonium organosiloxy groups and/or hydrous metal oxide groups and/or carboxyorganosiloxy groups. As mentioned above the hydrous polyvalent metal oxy groups may be simply deposited within the pores with little bonding to silicon.

The proportion or concentration of silicon-bonded hydroxyl groups on the porous silicate glass surfaces can be regulated by regulating the surface area of the porous silicate glass during its preparation as is well-known in the art. Generally, the surface area is controlled by the temperature and time at temperature during the phase-separation portion of the preparation of the porous silicate glass. Thus, the longer the time at the temperature and/or the higher the temperature used in the phase-separation, the greater the pore diameter and, therefore, the smaller the surface area per gram in the resulting porous silicate glass. Conversely, the surface area, and thus the proportion of surface≡SiOH groups available for reaction with the organofunctionalsilane and/or hydrous metal oxide can be increased by lowering the time and/or temperature of the heat treatment used to induce phase-separation.

The silicon content of the borate rich phase formed in the manufacture of porous glass precipitates as silica gel during the leaching of the porous glass and this precipitate greatly increases the surface area and the proportion of silicon-bonded hydroxyl groups available for reaction with the organofunctionalsilane or hydrous metal oxide. Thus, an additional technique for increasing the surface area and the proportion of silicon-bonded hydroxyl groups is to start with a composition which will produce large quantitites of a silica gel precipitate. This can be accomplished by increasing the amount of silica initially used in the composition from which the glass is made. Any other techniques known by the skilled worker for increasing, or decreasing if desired, the proportion of surface ≡SiOH groups can be used to provide a porous glass having the desired proportion of surface silicon-bonded hydroxyl groups available for reaction with the organofunctionalsilanes and/or hydrous polyvalent metal oxides.

The above-described porous silicate glass having surface hydroxyl groups bonded to silicon is then converted into the anion exchangers utilized in the processes of the present invention.

In a first approach, a water soluble organofunctional silane is reacted wtih the silicon-bonded hydroxyl groups of the glass. Suitable and preferable water soluble organofunctional silanes useful in the present invention are presented by the structural formula:

$$[HR''NC_nH_{2n}]_cSi(OR)_a(R')_b$$

wherein a is in integer of 1 through 3, b is an integer of 0 through 2, c is an integer of 1 through 5, preferably 1, a+b+c is equal to four, n is an integer from 1 through 10, preferably 2 to 4, R is an alkyl group, such as a $C_1$–$C_6$ alkyl group, and preferably is methyl or ethyl, and R' is a monovalent hydrocarbon group, preferably having 1 to 10 carbon atoms, R'' is hydrogen, alkyl of 1 to 10 carbon atoms or aminoalkyl, $H_2NC_nH_{2n}$—, or carboxyalkylcarbonyl $HOOCC_nH_{2n}C(O)^-$. Exemplary of the monovalent hydrocarbon groups that are represented by R' are the $C_1$–$C_{10}$ alkyl groups (for example the methyl, ethyl, isopropyl, and n-butyl groups); the aryl groups (for example the phenyl and naphthyl groups); the aralkyl groups (for example, the benzyl and the phenylethyl groups); the alkaryl groups (for example, the styryl, tolyl, n-hexylphenyl groups), and the cycloalkyl groups (for example, the cyclohexyl group). Preferably R' is an alkyl group. Methyl and ethyl are the most preferred R' groups. However, other organofunctional silanes having groups capable of anion exchange reaction and having groups which are readily hydrolyzable can be utilized. For example, water soluble organofunctional silanes having more than one amino groups can be used. Hydrolyzable organofunctional silanes of the above formula are commercially available as "silane coupling agents." The preferred water soluble organofunctional silanes for use in the present invention are gamma-aminopropyltriethoxysilane and N-beta-(aminoethyl) gamma-aminopropyltrimethoxy silane. These two compounds are known commercially as Union Carbide's A-1100 and A-1120 silane coupling agents, respectively.

The —OR in the above formula are readily hydrolyzable and readily react with the silicon-bonded hydroxyl groups on the glass surfaces, for example, as represented by:

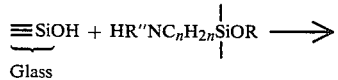

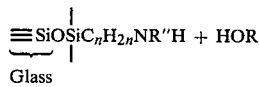

wherein R, R'' and n are as defined hereinabove and the remaining valences of the silane silicon not bonded to the $C_nH_{2n}$ group or the —OR group or glass are bonded to hydrocarbon groups, R', and/or bonded to other silicon atoms of the glass through divalent oxygen (resulting from reaction of second or third —OR groups) if present in the silane with silicon-bonded hydroxyl groups of the glass.

The reaction is preferably carried out in the presence of ammonium hydroxide at a pH in the range of from about 7 to about 11. The porous glass is soaked, for example, in an aqueous ammonium hydroxide solution of the aminoorganosilane for about 1 hour to about 24 hours at a temperature in the range of 0° C. to 30° C. The ammoniacal solution typically contains from 1% to 10% by weight of the organofunctional silane. Soaking at higher temperatures decreases the stability of the silane. The soaked rods are then dried under vacuum at a temperature of from about 0° C. to about 30° C. for between about 2 hours to 24 hours. The dried rods are then heated from the drying temperature to between about 200° C. to 450° C. to secure the bonding between the silane and the glass surface. Hydration of the amino group, i.e., where R'' is hydrogen or alkyl, can then be accomplished by contacting with water or by contacting with the aqueous solution to be treated; said hydration being represented by:

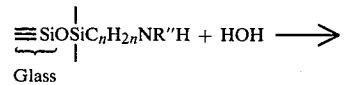

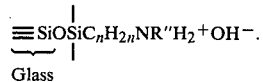

In the case where R'' is aminoalkyl-$C_nH_{2n}NH_2$, the hydration is represented by:

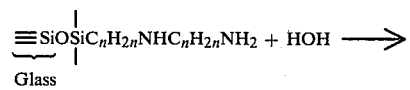

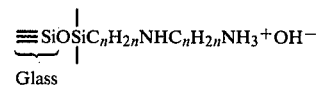

Where R'' is carboxyalkyl, the carboxy group may be converted to an ester or salt group before or during the reaction with the silicon-bonded hydroxyl groups of the glass and then reconverted back to the carboxy group, —$COO^-H^+$, by slight to moderate acidification.

In a second approach, insoluble hydrous inorganic polyvalent metal oxides which exhibit anion exchange properties involving surface hydroxyl groups are incorporated into the pores of the porous glass structure. Exemplary of the insoluble hydrous metal oxides are $ZrO_2$, $PbO_2$, $ThO_2$, $TiO_2$, $Mg_2O$, $Al_2O_3$, and $SnO_2$. Of these, $ZrO_2$ and $PbO_2$ are preferred. In this approach, the soluble nitrate salt of the hydrous metal oxide, such as $Zr(NO_3)_4$ and $Pb(NO_3)_2$ is deposited inside the porous glass by the molecular stuffing process as described in detail in U.S. Pat. No. 4,110,096 by P. B. Macedo and T. A. Litovitz herein incorporated by reference in its entirety. Various guidelines for stuffing porous glass rods are set forth at column 16, line 45 to column 17, line 29. Briefly the stuffing process would involve immersing the porous glass in an aqueous solution of the metal nitrate to diffuse the metal nitrate into the pores and drying in an oven to precipitate the metal nitrate. Drying temperatures in the range of about 100° C. to about 150° C. and drying times of about 1.5 hours to about 12 hours are suitable. The concentration of the metal nitrate in the aqueous solution is typically between about 2% to 70% by weight based on the weight of the solution. During the molecular stuffing process as least a portion of the metal nitrate, such as zirconium nitrate, reacts with the glass to replace the silicon-bonded hydroxyl group. This reaction in its simplest form can be represented by:

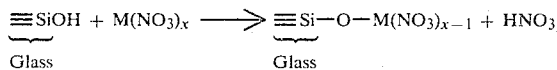

In the above formula, x is an integer of 2 to 4, preferably 3 through 4, and represents the valence of the metal cation, M. Of course more than one nitrate group —NO$_3$ of the polyvalent metal nitrate molecule can react with more than one silicon-bonded hydroxyl group such that the polyvalent metal is bonded through oxy groups to more than one silicon atom of the glass. The silicon-bonded (or boron-bonded) nitrate is then decomposed by heating the stuffed porous glass at a temperature from about 200° C. to about 700° C. for about 0.5 to 12 hrs. The portion of the precipitated metal nitrate which does not react with the glass and which is entrapped within the pores is also converted to the oxide during the nitrate decomposition step. The oxides are then hydrated by treatment with water anion exchangeable hydroxyl groups to the metal as represented by the formula:

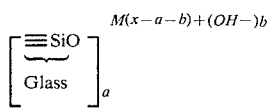

wherein x and M are as previously defined, a is an integer of 1 to 3, b is an integer of 1 to 3 and (a+b) is an integer not greater than x and (x—a—b)+ represents the remaining valance of M not bonded through oxygen to silicon as well as similar reactions involving boron sites on the glass or gel surface. Alternatively, the hydration can be performed by the aqueous solution to be treated, such as the radioactive waste stream.

Alteratively, the anchoring of the insoluble polyvalent metal salts to the silica matrix of the porous glass or silica gel can be accomplished by first reacting the porous glass or porous silica gel with the hydroxide of an alkali metal, a Group Ib metal and/or ammonium to bond the cations of said metal or ammonium to silicon atoms of said glass or silica gel through divalent oxygen linkages and then reacting the resulting intermediate porous cation exchange silica glass or gel (containing alkali metal, Group Ib metal and/or ammonium cations bonded to silicon of the glass or gel through oxy linkages) with the polyvalent metal nitrate. Suitable alkali metal, Group IB and/or ammonium cation exchange mediums and method for making them are disclosed in copending applications Ser. No. 39,595, filed May 16, 1979 and Ser. No. 959,222, filed Nov. 9, 1979. The disclosures of both applications relate to both the identity and methods for making the porous glass or porous silica gel cation exchangers are incorporated herein by reference. The preferred intermediate cation exchange porous glass or porous silica gel has sodium ions bonded to silicon of the glass or gel through divalent oxygen linkages. It can be prepared, for example, by replacing the protons of the ≡SiOH groups of the porous glass or porous silica gel with sodium derived from a sodium salt, such as NaNO$_3$ in an NH$_4$OH medium. The porous intermediate cation exchange glass or silica gel can be easily reacted with the nitrate salt of the hydrous polyvalent metal oxide in an acidic aqueous medium having a pH of from about 0.5 to about 6. In the reaction, metal nitrate groups, —M(NO$_3$)$_{x-1}$, are exchanged for said alkali metal, Group Ib metal and/or ammonium cations bonded to silicon atoms of the glass through divalent oxygen linkages to anchor or bond the polyvalent metal nitrate group to the silica glass or gel structure, which can be represented as:

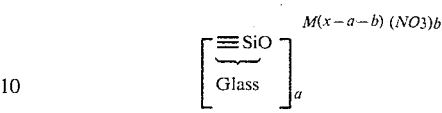

M, x, a and b are as defined above. The nitrate groups attached to the metal cation, M, are replaced by hydroxyl groups by treating the M(NO$_3$)$_{x-}$ exchanged rod with an aqueous ammonium hydroxide solution at a temperature of from about 10° C. to about 60° C. for between about 1 hour and 12 hours to yield a porous silica glass or porous silica gel having anion exchange properties involving surface hydroxyl groups. Subsequently, the porous glass or silica gel is preferably washed with water to remove excess ammonium hydroxide. Alternatively, the nitrate could also be decomposed to the oxide and the oxide then hydrated as described in the second approach hereinabove.

The proportion of anion exchangeable hydroxyl groups bonded to silicon of the porous glass or silica gel through the organofunctionalsiloxy groups and/or through the metal oxy groups can be regulated by several techniques. Of course, the proportion of silicon-bonded hydroxyl groups in the porous glass or silica gel will determine generally the maximum amount of silicon-bonded organofunctionalsiloxy groups and/or polyvalent metal oxy groups obtainable. The amount of these groups, in turn, will determine the maximum amount of said anion-exchangeable hydroxyl groups obtainable. Longer times of contact of the organofunctional silane and/or metal nitrate with the porous glass or silica gel will increase the proportion of the silicon-bonded organofunctionalsiloxy groups and polyvalent metal oxy groups, respectively. Also, the smaller the particle size of the porous glass or silica gel, the greater the proportion of the silicon-bonded organofunctionalsiloxy and/or metal oxy groups within a given time. Longer times of contact with the ammonium hydroxide during the hydration step will increase the proportion of said anion-exchangeable hydroxyl groups. Any other suitable technique can be used to regulate the proportion of anion-exchangeable hydroxyl groups bonded to silicon of the porous glass or silica gel through the organofunctionalsiloxy groups and/or through the metal oxy groups to the desired level.

The porous ion exchange silicate glass contains about 0.1 mol percent to about 10 mol percent, preferably about 0.5 mol percent to about 4 mol percent of nonradioactive anion exchangeable hydroxyl groups bonded to said organofunctionalsiloxy and/or polyvalent metal oxy groups or cation exchangeable protons bonded to oxycarbonylalkyleneaminoalkylenesiiloxy groups. The surface to weight ratios for the porous silicate glass employed in our invention are at least about 0.1 m$^2$/g to at least several thousand m$^2$/g, e.g., 10,000 m$^2$/g, preferably at least upwards of 100 m$^2$/g. Desirably, the surface to weight ratio of the starting silicate glass ranges from about 5 to about 1500 m$^2$/g.

The following examples are presented. Unless otherwise specified all solutions are aqueous solutions, the "aqueous ammonium hydroxide" or "NH4OH" wherever used in the Examples contains about 28% NH3, ppm means parts per million parts of solution, ppb means parts per billion parts of solution, ppt means parts per trillion parts of solution, all parts and percentages are on a weight bases, all temperatures are given in degrees Centigrade, and anion exchange tests were carried out at room temperature and at a pH of 6 unless otherwise indicated.

EXAMPLE 1

This example illustrates the preparation of the porous glass that is used in the subsequent examples.

In the subsequent examples, unless otherwise specified, the porous glass that is used is in the form of cylinders or rods 6 to 9 mm in diameter and one to several centimeters in length. The porous glass is formed by the method disclosed hereinabove; that is, a mixture of powders of silica, boric acid, sodium carbonate and potassium carbonate is prepared in such proportions that yield a glass nominally comprising 3.5 mol percent $Na_2O$, 3.5 mol percent $K_2O$, 33 mol percent $B_2O_3$ and 60 mol percent $SiO_2$. The mixture is heated in a Pt crucible up to 1400° C. in an electric furnace and thus is melted into a molten glass which is pulled into rods about 8 mm in diameter and cut to about 2.5 cm long. After cooling, the glass is phase-separated by heat treating at 550° C. for 2 hours and then is leached in a 3 N HCl bath at 95° C. for three days. Phase-separation results in two phases; one, a high silica phase and a low silica phase comprising the remaining silica, boron trioxide and alkali metal oxide. Leaching removes the boron-rich phase leaving behind a porous glass comprising about 95 mol percent $SiO_2$ and about 5 mol percent $B_2O_3$ and having interconnected pores and at least about 3 mol percent silicon-bonded hydroxyl groups. Subsequent rinsing in water yields a porous glass preform ready for use in the following examples.

EXAMPLE 2

In this example, there is described the use of an organofunctionalsilane possessing a single-NH2 functional group, namely, the gamma-aminopropyltriethoxysilane to alter the surface characteristics of the porous glass so as to give it anion exchange capability when hydrated.

Six 1" porous glass rods prepared as described in Example 1 were soaked in an aqueous solution containing 2% gamma-aminoproplytrithoxysilane by weight of the solution at 5° C. for 5 hours. This aqueous solution was prepared by first forming a dilute aqueous ammonium hydroxide solution having a pH of about 9, cooling it to a temperature of about 5° C. and then introducing the above-mentioned silane. The treated porous glass rods were then dried under vacuum at 5° C. for 18 hours, allowed to warm to room temperature, and finally were heated from room temperature to 200° C. in order to react the silicon-bonded ethoxy groups of the silane with the silicon-bonded hydroxy groups of the glass to form ≡SiOSi≡ bonds between the glass and the silane, thus bonding the silane to the glass surface.

Two anion-containing test media were prepared comprising 100 ml of an aqueous solution containing 56.0 ppm $CrO_4^{-2}$ and a 100 ml of an aqueous solution containing 41.8 ppm $MoO_4^{-2}$. Three glass rods treated as described above were immersed in the chromate solution and three were immersed in the molybdate solution. The decreases of $CrO_4^{-2}$ and $MoO_4^{-2}$ anions in the respective solutions due to anion-exchange into the glass rods were measured against soaking time. The results are shown in Table 3 below.

TABLE 3

| Soaking Time (hrs) | $CrO_4^=$ Concentration (ppm) | $MoO_4^=$ Concentration (ppm) |
|---|---|---|
| 0 | 56 | 41.8 |
| 1 | 54.5 | 35 |
| 2 | 53 | 28 |
| 3 | 52 | 21 |
| 11 | 44.5 | 11 |
| 24 | 44 | 6 |

These results illustrate the effectiveness of the treated porous glass rods in removing anions from highly dilute aqueous solutions and illustrates the special effectiveness with respect to the molybdate solution. The anion exchange capacity of the treated porous glass rods for the chromate anion would be capable of removing radioactive chromate anions from very large volumes of radioactive coolants (typically containing $4 \times 10^{-9}$ ppm of Cr as $CrO_4$). For example, it would be capable of removing chromate anions from $7 \times 10^8$ cc of coolant per cc of treated porous glass on a calculated basis.

EXAMPLE 3

The procedure of Example 2 was repeated except that:

(i) the organofunctionalsilane had one -NH2 group and one =NH group; specifically, N-beta-aminoethyl-gamma-aminopropyltrimethoxysilane was used here to change the surface characteristics of the porous glass;

(ii) the silane concentration in the glass rod treatment step was 4% instead of 2%; and (iii) the anion concentrations of the anion-containing media were initially 52.4 ppm $CrO_4^{-2}$ and 45.4 ppm $MoO_4^{-2}$, respectively. The results of the anion exchange test are given in Table 4 below.

TABLE 4

| Soaking Time (hrs) | $CrO_4^=$ Concentration (ppm) | $MoO_4^=$ Concentration (ppm) |
|---|---|---|
| 0 | 52.4 | 45.4 |
| 1 | 43 | 19 |
| 2 | 41 | 10 |
| 4 | 34.5 | 4 |
| 24 | 36 | 4.5 |

These results illustrate the effectiveness of the treated porous glass rods in removing anions from highly dilute aqueous solutions and illustrate the special effectiveness of the treated porous glass rods in respect to the molybdate solution.

EXAMPLE 4

This example illustrates the treatment of porous glass which is provided with anion exchange capability by hydrous zirconium bonded through oxy groups to silicon of the glass.

Two 3" porous glass rods prepared as described in Example 1 were immersed in an 11.7% $Zr(NO_3)_4 \cdot 5H_2O$ aqueous solution at room temperature for 17 hours thus allowing the $Zr(NO_3)_4$ to diffuse inside the pores of the glass. The stuffed rods were then transfered to an oven at 100° C. for 1½ hours to evoke precipitation of the Zr salt by evaporation of the water. Finally the rods were heated to 200° C. under vacuum to decompose the nitrate within the glass pores into zirconium oxide which hydrates in the presence of water to impart anionic exchange capability. It is believed that the hydrated zirconium atoms bonded to each other in the form of crystals and that some of the zirconium atoms are bonded to silicon of the glass rod through divalent oxygen linkages.

Two anion-containing test media were prepared comprising 100 ml of an aqueous solution of 56.0 ppm $CrO_4^{-2}$ and 100 ml of an aqueous solution of 41.8 ppm $MoO_4^{-2}$. One treated rod was immersed in the chromate solution to remove $CrO_4^{-2}$ therefrom and the other rod was immersed in the molybdate solution to remove $MoO_4^{-2}$ ions therefrom. The results are given in Table 5 below.

TABLE 5

| Soaking Time (hrs) | $CrO_4^=$ Concentration (ppm) | $MoO_4^=$ Concentration (ppm) |
|---|---|---|
| 0 | 56 | 41.8 |
| 1 | 48.5 | 40 |
| 2 | 42.5 | 33.5 |
| 4 | 26 | 27 |
| 11 | 15 | 16 |
| 24 | 8 | 10 |

These results show that the hydrated zirconium oxide treated porous glass rods are highly efficient in removing chromate and molybdate anions from very dilute solutions containing same. These rods were heated to 850° C. to collapse the pores thus permanently fixating the exchanged anions ($CrO_4^=$ and $MoO_4^=$) into the glass structure.

EXAMPLE 5

The procedure of Example 4 was repeated except that:

Hydrous oxides of lead instead of zirconium were impregnated into the porous glass by molecular stuffing with $Pb(NO_3)_2$, then precipitating the salt at 100° C., and finally decomposing the nitrate at 500° C. and then hydrating. The concentration of the aqueous stuffing solution was 45% $Pb(NO_3)_2$ at 95° C. The results of removal by anion exchange of the anions from the anion-containing test media are given in Table 6 below.

TABLE 6

| Soaking Time (hrs) | $CrO_4^=$ Concentration (ppm) | $MoO_4^=$ Concentration (ppm) |
|---|---|---|
| 0 | 56 | 42 |
| 1 | 48.5 | 39 |
| 2 | 47 | 36 |
| 4 | 46 | 36 |
| 11 | 43.5 | 33.5 |
| 24 | 41 | 31 |

These results show that hydrated lead oxide treated porous glass rods are effective in removing chromate and molybdate anions from dilute solutions containing same.

EXAMPLE 6

This example illustrates the anchoring of an insoluble salt moiety, namely—$OZr(OH)_3$ to silicon of porous glass and then making use of the zirconium-bonded OH groups to ion exchange with other anions. A 2" porous glass rod prepared as described in Example 1 was immersed in a solution containing 14 g $NaNO_3$, 12 ml $NH_4OH$ and 38 ml $H_2O$ at room temperature for 17 hours to exchange the protons of the silicon-bond hydroxyl groups on the glass surface for Na ions in the ammonia base solution. The rod was washed afterwards to remove any excess $Na^+$. The washed rod was then soaked in a 17% $Zr(NO_3)_4 \cdot 5H_2O$ aqueous solution for 24 hours at room temperature to exchange $Zr^{+4}$ for $Na^+$. Finally, the $Zr(NO_3)$-exchanged rod was immersed in a 24% $NH_4OH$ solution at room temperature for 17 hours to replace the $NO_3$ groups with the OH groups of the ammonia solution. Subsequently, the rod was washed free of excess ammonia and was immersed in a chromate anion exchange medium initially containing 13.1 ppm $CrO_4^{-2}$. The decrease of $CrO_4^{-2}$ ions in the solution due to ion-exchange vs. soaking time is shown in Table 7 below.

TABLE 7

| Soaking Time (hrs) | $CrO_4^=$ Concentration (ppm) |
|---|---|
| 0 | 13.1 |
| 4 | 12 |
| 24 | 11 |

These results show the anionic porous glass rods of this Example to be effective in removing anions from dilute solutions containing same and are capable of treating very large volumes of dilute radioactive coolants to remove radioactive anions therefrom.

EXAMPLES 7–11

The procedures described for Examples 2 through 6 are respectively carried out in Examples 7 through 11 except that the chromate and molybdate anions used in the test media are radioactive; otherwise all steps, proportions, materials and conditions are the same. The concentrations of radioactive anions chemically bound in the final glass product are essentially the same as those concentrations correspondingly given in Tables 3–7.

EXAMPLE 12

This example illustrates a method for treating primary coolant from a pressurized water nuclear reactor plant. A mixture of powders of silica, boric acid, sodium carbonate and potassium carbonate is prepared in such proportions that yield a glass comprising 3.5 mol percent $Na_2O$, 3.5 mol percent $K_2O$, 33 mol percent $B_2O_3$ and 60 mol percent $SiO_2$. The mixture is heated in a platinum crucible up to 1400° C. in an electric furnace to produce a molten glass which is pulled into rods about 8 mm in diameter. The glass rods are cooled and the glass is phase-separated by heat treating at about 550° C. for about 110 minutes. The rods are then crushed to form a powder which is sieved through a 32 mesh screen onto a 150 mesh screen. The glass particles collected on the 150 mesh screen are leached in 3 N HCl at about 80° C. for about 6 hours to remove the boron-rich phase and leave behind a porous glass comprising about 95 mol percent $SiO_2$ and about 5 mol percent $B_2O_3$. The porous glass has interconnected pores and contains at least about 5 mol percent silicon-bonded hydroxyl groups. The glass particles are then rinsed in deionized water until the rinse water reaches a pH of about 7.

The porous glass powder is then immersed in an approximate 3.2 molar lithium nitrate-ammonium hydroxide aqueous solution (1 part ammonium hydroxide to 3 parts water) for three days and then is rinsed in water until the pH of the rinse water is reduced to about 8. The resulting powder is then placed into a Vycor glass* tube plugged with a filter at the bottom to prevent the powder from escaping, thus forming an ion exchange column. A radioactive primary coolant from a pressurized water nuclear reactor plant utilizing $UO_2$ fuel clad in stainless steel (containing 4.9 weight percent $^{235}U$) is passed through the column. The primary coolant has the composition of 100 ppm boron, 1 ppm lithium, about 100 ppb silica and the radionucleides listed in Table 8 below which lists the radionuclide, the probable source, the probable form and the average concentration in microcuries per milliliter.

*Vycor brand silica glass No. 7913 made by Corning Glass Works and containing 96 wt. % silica and 4 wt. % $B_2O_3$.

TABLE 8

| Radionuclide | Probable Source[a] | Probable Form[b] | Average Concentration (uCi/ml) | Average Concentration (ppb) |
|---|---|---|---|---|
| $^3H$ | (1), (2) | Water, gas | 2.4 | 0.249 |
| $^{14}C$ | | | $1.2 \times 10^{-5}$ | $2.69 \times 10^{-3}$ |
| $^{24}Na$ | (1) | Cation | $1.9 \times 10^{-2}$ | $2.18 \times 10^{-6}$ |
| $^{32}P$ | | | $3.3 \times 10^{-5}$ | $1.16 \times 10^{-8}$ |
| $^{35}S$ | | | $3 \times 10^{-6}$ | $7.08 \times 10^{-8}$ |
| $^{51}Cr$ | (1) | Anion | $3.7 \times 10^{-4}$ | $4.02 \times 10^{-6}$ |
| $^{54}Mn$ | (1) | Cation, s | $2.7 \times 10^{-4}$ | $3.38 \times 10^{-5}$ |
| $^{55}Fe$ | (1) | Cation, s | $1.9 \times 10^{-4}$ | $7.6 \times 10^{-5}$ |
| $^{59}Fe$ | (1) | Cation, s | $1.0 \times 10^{-5}$ | $2.03 \times 10^{-7}$ |
| $^{57}Co$ | (1) | Cation, s | $1.2 \times 10^{-6}$ | $1.42 \times 10^{-7}$ |
| $^{58}Co$ | (1) | Cation, s | $4.7 \times 10^{-4}$ | $1.48 \times 10^{-5}$ |
| $^{60}Co$ | (1) | Cation, s | $7.7 \times 10^{-5}$ | $6.81 \times 10^{-5}$ |
| $^{63}Ni$ | (1) | Cation, s | $8.0 \times 10^{-6}$ | $1.30 \times 10^{-4}$ |
| $^{64}Cu$ | (1) | Cation, anion, s | $5.4 \times 10^{-4}$ | $1.41 \times 10^{-7}$ |
| $^{89}Sr$ | (2) | Cation | $2.8 \times 10^{-6}$ | $9.93 \times 10^{-8}$ |
| $^{90}Sr$ | (2) | Cation | $4 \times 10^{-7}$ | $2.84 \times 10^{-6}$ |
| $^{91}Sr$ | (2) | Cation | $9.8 \times 10^{-5}$ | $2.76 \times 10^{-8}$ |
| $^{90}Y$ | (2) | s | | |
| $^{91}Y$ | (2) | s | | |
| $^{92}Y$ | (2) | s | | |
| $^{95}Zr$ | (1), (2) | s | $1.7 \times 10^{-5}$ | $8.06 \times 10^{-7}$ |
| $^{95}Nb$ | (1), (2) | s | $1.9 \times 10^{-5}$ | $4.83 \times 10^{-7}$ |
| $^{99}Mo$ | (1), (2) | Anion | $1.2 \times 10^{-4}$ | $2.54 \times 10^{-7}$ |
| $^{103}Ru$ | (2) | s | 0 | |
| $^{106}Ru$ | (2) | s | 0 | |
| $^{122}Sb$ | (1) | s | $1.0 \times 10^{-4}$ | $2.62 \times 10^{-7}$ |
| $^{124}Sb$ | (1) | s | $2.0 \times 10^{-5}$ | $1.16 \times 10^{-6}$ |
| $^{132}Te$ | (2) | Anion, s | | |
| $^{131}I$ | (2) | Anion | $4.6 \times 10^{-5}$ | $3.71 \times 10^{-6}$ |
| $^{132}I$ | (2) | Anion | | |
| $^{133}I$ | (2) | Anion | $6.2 \times 10^{-4}$ | $5.5 \times 10^{-7}$ |
| $^{135}I$ | (2) | Anion | $9 \times 10^{-4}$ | $2.60 \times 10^{-7}$ |
| $^{134}Cs$ | (2) | Cation | $4.7 \times 10^{-7}$ | $3.62 \times 10^{-7}$ |
| $^{136}Cs$ | (2) | Cation | 0 | |
| $^{137}Cs$ | (2) | Cation | $1.1 \times 10^{-6}$ | $1.26 \times 10^{-5}$ |
| $^{140}Ba$ | (2) | Cation | $4.7 \times 10^{-6}$ | $6.45 \times 10^{-8}$ |
| $^{141}Ce$ | (2) | Anion, s | 0 | |
| $^{143}Ce$ | (2) | Anion, s | 0 | |
| $^{144}Ce$ | (2) | Anion, s | 0 | |
| $^{143}Pr$ | (2) | Anion, s | | |
| $^{110m}Ag$ | (1) | s | $1.2 \times 10^{-5}$ | $2.52 \times 10^{-6}$ |
| $^{181}Hf$ | (1) | s | $6 \times 10^{-6}$ | $3.70 \times 10^{-7}$ |
| $^{182}Ta$ | (1) | s | $2.5 \times 10^{-5}$ | $4.01 \times 10^{-6}$ |
| $^{183}Ta$ | (1) | s | $6.2 \times 10^{-5}$ | $4.34 \times 10^{-7}$ |
| $^{185}W$ | (1) | s | $1.2 \times 10^{-5}$ | $1.28 \times 10^{-6}$ |
| $^{187}W$ | (1) | s | $3.7 \times 10^{-4}$ | $5.30 \times 10^{-7}$ |
| $^{85m}Kr$ | (2) | Gas | | |
| $^{85}Kr$ | (2) | Gas | | |
| $^{88}Kr$ | (2) | Gas | | |
| $^{133}Xe$ | (2) | Gas | $8.9 \times 10^{-5}$ | $4.78 \times 10^{-8}$ |
| $^{135}Xe$ | (2) | Gas | $9 \times 10^{-5}$ | $3.54 \times 10^{-8}$ |

[a](1) Neutron activation products of nuclides from fuel cladding, construction material, and water.
(2) Leakage from fuel. Mostly fission products.
[b]Gas: presumably as dissolved gas.
s: insoluble solids.

The radioactive cations listed in Table 8 cation-exchange with lithium cations bonded to silicon through oxy groups in the porous glass thereby binding the radionuclides to the porous glass through said silicon-bonded oxy groups and releasing lithium cations to the coolant solution. The insoluble radioactive solids in the coolant also filter out on the external surfaces of the porous glass particles. Additional porous glass particles can be added to increase the filtering capacity of the ion exchange column as the insoluble solids build-up in the column. Under some conditions, mainly dependent on existing governmental regulations, the porous silicate glass containing bound cationic radionuclides may be disposed and/or buried or suitably containerized often times in steel and/or concrete or mixed with cement powder or urea-formaldehyde formulations and "set" therein and thereafter disposed and/or buried. The particulate porous glass can be heated to collapse the pores thereof as described herein.

The anionic radionuclides are not substantially removed in the above-mentioned column and pass with the coolant through the column. The anionic radionuclides are subsequently removed by passing the coolant through a glass column packed with any one of the porous glass anion exchangers described in Examples 2–6.

The glass column is prepared as follows:

An open porous tube is prepared by pulling a glass tube of the same composition as described in Example 1 and phase-separated and leached as in Example 1, and having an outside diameter of 10 mm and a wall thickness of ~1 mm. The porous tube is then soaked in a solution saturated with $CsNO_3$ with enough $NH_4OH$ to give a pH of 10 for 18 hrs, and washed in room temperature water until a pH of 7 is obtained. The Cs exchanged tube is subsequently dried under vacuum and is heated from room temperature to 600° C. at 15° C./hr and from 600° C. to 870° C. at 50° C./hr to collapse the pores.

When the porous anion exchange glass becomes loaded with anionic radionuclides, the entire column containing the loaded porous anion exchange glass is removed from the system and a fresh column is substituted. The loaded column is held in a safe location for three months to allow th $I^{131}$ to completely decay, a precaution taken to avoid evaporation of $I^{131}$ during subsequent heat treatments. Thereafter, the porous glass particles can be heated to collapse the pores thereof and, if desired, the column can be heated to collapse the glass tube around the particles thereby enveloping the filtered solids and the glass particles containing the cationic and anionic radionuclides within the glass column. While the glass column may crack because of differential thermal contraction, it still contains and further immobilizes the radioactive materials and forms a product that is many times more durable than cement or metal drums heretofore used. There is thus provided a durable package of concentrated radionuclides which is highly resistant to leaching by water or other fluids.

As illustrated in Example 12, liquid radwaste that must be satisfactorily treated and disposed of can be highly dilute. The volume of dilute radwaste treated with a given amount of ion exchange porous glass or silica gel pursuant to this invention can be practically unlimited before all the available exchange sites (i.e. silicon-bonded alkali metal oxy, Group Ib, metal oxy, ammonium oxy, hydroxy ammonium organosiloxy, hydrous polyvalent metal oxy and carboxyorganosiloxy groups) in the porous silicate glass or silica gel are filled by radioactive cations. For Example, the weight of the dilute liquid radwaste described in Example 12 that could be expected to be treated before exhausting all exchange sites would be of the order of $10^9$ or more times the weight of the ion exchange porous glass or silica gel employed. Furthermore, it could be expected that other parts of the system would require overhaul, e.g., repair or replacement of pumps or piping or other equipment, before the ion exchange silicate glass or silica gel becomes exhausted. Consequently, it is quite possible, if not probable, that the radioactivity of the resulting porous glass or silica gel when disposed of may never reach 1 millicurie or even 1 microcurie per cc. of the glass or silica gel. In the absence of malfunction requiring overhaul of the other parts of the radwaste treatment system, 100 or less to $10^9$ or more, preferably 100 to $10^6$, weight parts of radwaste can be treated for each weight part of porous silicate glass or silica gel having silicon-bonded anion and/or cation exchange groups pursuant to this invention.

For reasons of safety all simulated radwaste solutions used in the Examples were actually non-radioactive; however, radioactive solutions of the same kind can be substituted and concentrated and encapsulated in accordance with the foregoing Examples.

EXAMPLE 13

In this example, there is described the use of particles of cation-exchange porous glass possessing a carboxyl functional group,

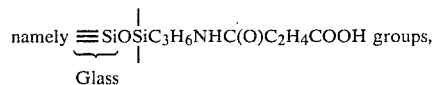

bonded to silicon of porous silicate glass on the internal surfaces of the pores thereof. Porous glass of this type is purchased from the Pierce Chemical Company, POB 117, Rockford, Illinois 61105. The glass particles containing the above-mentioned functional groups are immersed in an aqueous solution containing 10 ppm radioactive strontium cations (2.35 mg strontium per 100 ml $H_2O$) at about 25° for about three days while occasionally stirring the solution. After this period of soaking the particles are removed and dried at room temperature. After the soaking period the solution is analyzed by atomic absorption for strontium and has a lower concentration of strontium illustrating the effectiveness of the carboxy organosiloxy group containing glass in removing radioactive cations from aqueous solutions containing same.

EXAMPLE 14

This example illustrates the treatment of porous glass which is provided with anion exchange capability by hydrous titanium bonded through oxy groups to silicon of the glass as well as hydrous titanium oxides which are molecular stuffed in the pores of a glass matrix.

Six 2" long porous glass rods prepared as described in Example 1 were immersed in a solution of 18 g $TiO_2$ and 100 ml of 3N $HNO_3$ at room temperature for about 65 hours thus allowing the $TiO_2$ to become $Ti(NO_3)_4$ and to diffuse inside the pores of the glass. Four of the resulting six stuffed rods were then transferred to an oven at 200° C. for 2 hours under vacuum to dry the rods by evaporation of the water as well as to decompose the titanium nitrates residing in the pores of the glass. Two other rods were put into $NH^4OH$ for 2 hours at room temperature and then evacuated for 2 hours at room temperature to dry them and subsequently were heated gradually from 200° C. to 400° C. to decompose the nitrates and precipitate Ti in the oxide form. All six rods were black indicating the presence of some reduced $Ti^{+3}$ (e.g. $Ti_2O_3$). The titanium oxides within the pores hydrate upon contact with water (e.g., from the atmosphere or from the aqueous radwaste solution or otherwise) to impart anion exchange capability. It is believed that some of the hydrated titanium atoms are bonded to each other in the form of crystals and that some of the titanium atoms are bonded to silicon of the glass rods through oxy linkages.

Two anion-containing test media were prepared comprising 35 ml of an aqueous solution of 5.5 ppm $CrO_4^{-2}$ and 35 ml of an aqueous solution of 31.7 ppm $MoO_4^{-2}$. Two treated rods from the first group were immersed in the chromate solution to remove $CrO_4^{-2}$ therefrom and the other two rods from the first group were immersed in the molybdate solution to remove $MoO_4^{-2}$ ions therefrom. The results are given in Table 9 below.

TABLE 9

| Soaking Time (hrs.) | $CrO_4^=$ Concentration (ppm) | $MoO_4^=$ Concentration (ppm) |
|---|---|---|
| 0 | 5.5 | 31.7 |
| 1 | 4.6 | 14.8 |
| 2 | 3.7 | 7.2 |
| 6 | 2.2 | 2.7 |
| 19 | 0.8 | 1.4 |

Similarly, one treated rod from the second group (of two rods) was immersed in an identical chromate solution to remove $CrO_4^{-2}$ therefrom and the other rod from the second group was immersed in an identical molybdate solution to remove $MoO_4^{-2}$ therefrom. The results are given in Table 10 below.

TABLE 10

| Soaking Time (hrs.) | $CrO_4^=$ Concentration (ppm) | $MoO_4^=$ Concentration (ppm) |
|---|---|---|
| 0 | 5.5 | 31.7 |
| 1 | 5.3 | 29.9 |
| 2 | 4.6 | 27.3 |
| 6 | 3.7 | 21.4 |
| 19 | 1.7 | 11.2 |

We claim:

1. A process for separating and immobilizing radioactive anions and/or radioactive cations from a liquid containing same comprising contacting said liquid with a porous silica glass or gel comprising at least 82 mol percent silica having interconnected pores and (a) non-radioactive cationic organosiloxy groups bonded to silicon of the glass or gel on the internal surfaces of said pores and non-radioactive anions ionically bonded to said cationic organosiloxy groups and displaceable by said radioactive anions; and/or (b) non-radioactive anionic organosiloxy groups bonded to silicon of the glass or gel on the internal surfaces of said pores and non-radioactive cations ionically bonded to said anionic organosiloxy groups and displaceable by said radioactive cations; and/or (c) non-radioactive cationic polyvalent metals bonded to silicon of the glass or gel through divalent oxygen linkages on the internal surfaces of said pores and non-radioactive anions ionically bonded to said cationic metals and displaceable by said radioactive anions, to provide a distribution of radioactive anions and/or cations internally bonded within the pores of said glass or gel and heating the porous silicate glass or gel to collapse said pores containing said internally bonded radioactive anions and/or cations.

2. Process as claimed in claim 1 wherein a porous silica glass is used and (a) said non-radioactive organosiloxy groups are ammonium organosiloxy groups; (b) said non-radioactive anionic organosiloxy groups are oxycarbonylorganosiloxy groups; (c) said non-radioactive cationic polyvalent metal is selected from the group consisting of $-Zr^{3+}$, $-Pb^+$, $-Th^{3+}$ and $-Ti^{3+}$; said non-radioactive anions are hydroxyl anions; and said non-radioactive cations are protons.

3. Process as claimed in claim 3 wherein said ammonium organosiloxy groups are represented by the formula:

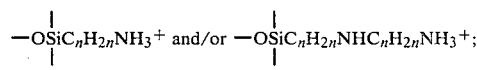

said oxycarbonylorganosiloxy groups are represented by the formula

wherein in said formulas n is an integer of 1 to 18 and the unfilled valances of silicon in each formula is connected through oxygen to silicon of the glass, and/or are connected to a monovalent hydrocarbon group, and/or is connected through silicon by carbon linkages to additional $-C_nH_{2n}NH_3^+$, $-C_nH_{2n}NHC_nH_{2n}NH_3^+$ or $-C_nH_{2n}NHC_nH_{2n}COO^-$ groups.

4. Process as claimed in claim 3 wherein said ammonium organosiloxy groups are represented by the formula:

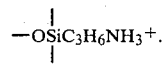

5. Process as claimed in claim 3 wherein said ammonium organosiloxy groups are represented by the formula:

6. Process as claimed in claim 3 wherein said oxycarbonylorganosiloxy groups are represented by the formula:

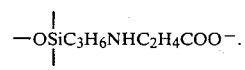

7. Process as claimed in claim 2 wherein the porous silica glass is represented by the formula:

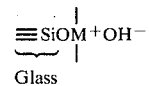

wherein M is a tetravalent metal in which the two unfilled valences of M are bonded ionically to additional $OH^-$ anions, are bonded through divalent oxygen linkage to another silicon of the glass and/or are bonded through divalent oxygen linkage to other M atoms.

8. Process as claimed in claim 1 wherein porous silica glass containing integral boron is used and some of said groups (a), (b) and (c) are bonded through oxy linkages to boron of said porous glass.

9. A process as claimed in claim 1 wherein the resulting glass is buried at sea.

10. A process as claimed in claim 1 wherein the resulting glass product is stored beneath the surface of the earth.

11. A process as claimed in claim 1 further comprising incorporating the resulting glass product into an instrument as a source of radioactivity.

12. A process as claimed in claim 11 further comprising destroying microorganisms employing said device.

13. A process as claimed in claim 11 further comprising sterilizing sewage sludge employing said device.

14. A sintered silicon dioxide-containing matrix containing radioactive anions internally bonded to internal silicon atoms of said matrix through polyvalent metal oxy groups selected from the group consisting of

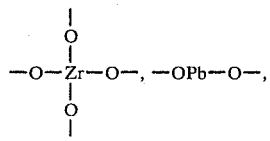

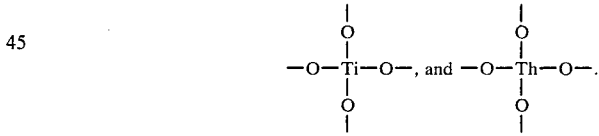

15. A matrix as claimed in claim 14 wherein said matrix is sintered porous silicate glass having a $SiO_2$ content of at least 82 mol percent.

16. A matrix as claimed in claim 14 containing at least 1 ppb radioactive material encapsulated and immobilized in said matrix.

17. A matrix as claimed in claim 14 containing at least 10 ppb radioactive material encapsulated and immobilized in said matrix.

18. A matrix as claimed in claim 14 wherein said radioactive anions are chromate, $Tc^-$ and/or molybdate.

19. A matrix as claimed in claim 14 characterized by a radiation activity of at least one microcurie per cubic centimeter of said matrix.

20. A matrix as claimed in claim 14 wherein said radioactive anions are derived from radioactive nuclear waste.

21. A method for the prevention of the dissemination of radioactive materials into the environment comprising surrounding radwaste containing radioactive cations and/or radioactive anions in a silica gel or silica glass substrate with an ion exchange backfill comprising a porous silicate glass or silica gel having interconnected pores and non-radioactive cationic and/or anionic groups bonded to silicon of the glass or gel on the internal surfaces of the pores thereof, said non-radioactive cationic and/or anionic groups being capable of being displaced by said radioactive cations and/or anions.

22. A method according to claim 21 wherein said ion exchange backfill is an anion exchange medium.

23. A method according to claim 21 wherein said ion exchange backfill is a cation exchange medium.

24. A method according to claim 21 wherein said ion exchange backfill is an anion exchange medium and a cation exchange medium.

25. A method as claimed in claim 21 wherein said radwaste is disposed in an underground site and said backfill surrounds said radwaste.

26. A method according to claim 21 wherein said ion exchange backfill comprises a porous silicate glass having interconnected pores and cationic ammonium organosiloxy groups bonded to silicon of the glass and/or anionic organosiloxy groups bonded to silicon of the glass and/or hydrous polyvalent metals bonded to silicon through divalent oxygen linkages on the internal surfaces of said pores.

27. A method according to claim 26 wherein said hydrous polyvalent metal is selected from the group consisting of Zr, Pb, Th, and Ti.

28. Method as claimed in claim 26 wherein (a) said non-radioactive organosiloxy groups are ammonium organosiloxy groups; (b) said non-radioactive anionic organosiloxy groups are oxycarbonylorganosiloxy groups; (c) said non-radioactive cationic polyvalent metal is selected from the group consisting of $-Zr^{3+}$, $-Pb^+$, $-Th^{3+}$ and $-Ti^{3+}$; said non-radioactive anions are hydroxyl anions; and said non-radioactive cations are protons.

29. Method as claimed in claim 28 wherein said ammonium organosiloxy groups are represented by the formula:

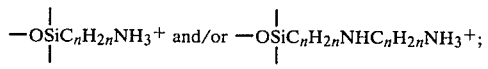

said oxycarbonylorganosiloxy groups are represented by the formula:

wherein in said formulas n is an integer of 1 to 18 and the unfilled valences of silicon in each formula are connected through oxygen to silicon of the glass, and/or is connected to a monovalent hydrocarbon group, and/or is connected through silicon to carbon linkages to additional $-C_nH_{2n}NH_3^+$, $-C_nH_{2n}NHC_nH_{2n}NH_3^+$ or $-C_nH_{2n}NHC_nH_{2n}COO^-$ groups.

30. Method as claimed in claim 29 wherein said ammonium organosiloxy groups are represented by the formula:

31. Method as claimed in claim 29 wherein said ammonium organosiloxy groups are represented by the formula:

32. Method as claimed in claim 29 wherein said oxycarbonylorganosiloxy groups are represented by the formula:

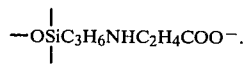

33. Method as claimed in claim 28 wherein the porous silica glass is represented by the formula:

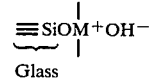

wherein M is a tetravalent metal in which the two unfilled valences of M are bonded ionically to additional $OH^-$ anions, are bonded through divalent oxygen linkage to another silicon of the glass and/or are bonded through divalent oxygen linkage to other M atoms.

34. A method according to claim 26 wherein said hydrous polyvalent metal is Zr.

35. A method according to claim 21 wherein said ion exchange backfill includes a porous silicate glass having interconnected pores and non-radioactive cations selected from the group consisting of alkali metal cations, Group Ib metal cations and/or ammonium cations bonded to silicon through divalent oxygen linkages on the internal surfaces of said pores, said nonradioactive cations being capable of being displaced by said radioactive cations to provide a distribution of internal silicon-bonded radioactive cation oxy groups within the pores of said glass.

36. A process for containing a radioactive material which comprises impregnating a porous silicage glass having interconnected pores and non-radioactive organofunctionalsiloxy groups bonded to silicon of the glass and/or having non-radioactive hydrous polyvalent metal oxides bonded to silicon of the glass through divalent oxygen linkages on the internal surfaces of said pores, said a liquid solution containing radioactive anions to dispose said solution within the pores of said glass to provide a distribution of internally bonded radioactive anions within the pores of said glass, and heating the porous glass to collapse said pores containing said internally bonded radioactive anions.

37. A method for preparing an anion exchange medium for the removal of radioactive anions from a liquid stream comprising bonding anion exchange groups to silicon-bonded oxygen of a porous silicate glass or porous silica-gel having interconnected pores, said anion exchange groups being polyvalent hydrous metal oxide groups exhibiting anion exchange properties involving surface hydroxyl groups, the hydrous metal oxide groups being bonded to silicon via divalent oxygen linkages by converting silicon-bonded hydroxyl groups of said porous glass or silica gel to alkali metal oxy groups, displacing the alkali metal ions with polyvalent metal nitrate groups, and replacing the nitrate groups with hydroxyl groups.

38. A method as claimed in claim 37 wherein the polyvalent metal nitrate group are selected from the group consisting of —Zr(NO$_3$), —PbNO, —Ti(NO$_3$), and —Th(NO$_3$).

39. A method as claimed in claim 38 wherein the silicon-bonded hydroxyl groups are converted to sodium oxy groups in an NH$_4$OH medium, the sodium atoms are displaced in a slightly acidic medium, and the nitrate groups are replaced by treatment with an NH$_4$OH solution.

40. A method in accordance with claim 39 wherein the nitrate groups are replaced with hydroxyl groups by heating to decompose the metal nitrate to the oxide and hydrating the oxide.

41. An underground reservoir for storing radioactive ionic wastes which are contained in a silica gel or silica glass substrate comprising a container containing said wastes disposed within an underground cavity and a backfill surrounding said container, said backfill comprising particles of silica glass or gel having interconnected pores and nonradioactive ions ionically bonded to ionic groups or atoms bonded to silicon of said glass or gel on the internal surfaces of said pores, said non-radioactive ions being displaceable bu said radioactive ions of said waste.

42. A package for storing radioactive ionic wastes which are contained in a silica gel or silica-glass substrate comprising a container containing said wastes and an overpack surrounding said wastes, said overpack comprising particles of silica glass or gel having interconnected pores and non-radioactive ions ionically bonded to ionic groups or atoms bonded to silicon of said glass or gel on the internal surfaces of said pores, said non-radioactive ions being displaceable by said radioactive ions of said waste.

43. Package as claimed in claim 42 wherein said rad-waste is contained in a first container, said overpack surrounds said first container and a second container contains said first container and said overpack.

44. A process for separating and immobilizing radioactive anions and/or radioactive cations from a liquid containing same comprising contacting said liquid with a porous silica glass or gel comprising at least 82 mol percent silica having interconnected pores and (a) non-radioactive cationic organosiloxy groups bonded to silicon of the glass or gel on the internal surfaces of said pores and non-radioactive anions ionically bonded to said cationic organosiloxy groups and displaceable by said radioactive anions; and/or (b) non-radioactive anionic organosiloxy groups bonded to silicon of the glass or gel on the internal surfaces of said pores and non-radioactive cations ionically bonded to said anionic organosiloxy groups and displaceable by said radioactive cations to provide a distribution of radioactive anions and/or cations internally bonded within the pores of said glass or gel.

45. Process as claimed in claim 44 wherein a porous glass is used and (a) a non-radioactive organosiloxy groups are ammonium organosiloxy groups; and (b) said non-radioactive anionic organosiloxy groups are oxycarbonylorganosiloxy groups; said non-radioactive anions are hydroxyl anions, and said non-radioactive cations are protons.

46. Process as claimed in claim 45 wherein said ammonium organosiloxy groups are represented by the formula:

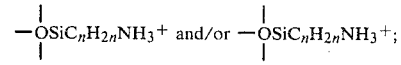

said oxycarbonylorganosiloxy groups are represented by the formula:

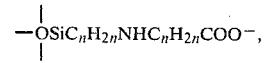

wherein in said formulas n is an integer of 1 to 18 and the unfilled valences of silicon in each formula is connected through oxygen to silicon of the glass, and/or are connected to a monovalent hydrocarbon group, and/or is connected through silicon by carbon linkages to additional —C$_n$H$_{2n}$NH$_3$+, —C$_n$H$_{2n}$NHC$_n$H$_{2n}$NH$_3$+ or —C$_n$H$_{2n}$NHC$_n$H$_{2n}$COO$^-$ groups.

47. Process as claimed in claim 46 wherein said ammonium organosiloxy groups are represented by the formula:

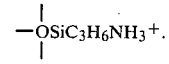

48. Process as claimed in claim 46 wherein said ammonium organosiloxy groups are represented by the formula:

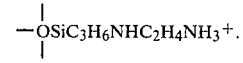

49. Process as claimed in claim 46 wherein said oxycarbonylorganosiloxy groups are represented by the formula:

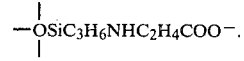

50. Process as claimed in claim 44 wherein porous silica glass containing integral boron is used and some of said groups (a) and (b) are bonded through oxy linkages to boron of said porous glass.

51. A method for the preparation of the dissemination of radioactive materials into the environment comprising surrounding radwaste containing radioactive cations and/or radio-active anions with an ion exchange backfill comprising a porous silicate glass or silica gel having interconnected pores and (a) non-radioactive cationic organosiloxy groups bonded to silicon of the glass or gel on the internal surfaces of said pores and non-radioactive anions ionically bonded to said cationic organosiloxy groups and displaceable by said radioactive anions; and/or (b) non-radioactive anionic organosiloxy groups bonded to silicon of the glass or gel on the internal surfaces of said pores and non-radioactive cations ionically bonded to said anionic organosiloxy groups and displaceable by said radioactive cations.

52. A method according to claim 51 wherein said ion exchange backfill is an anion exchange medium.

53. A method according to claim 51 wherein said ion exchange backfill is a cation exchange medium.

54. A method according to claim 51 wherein said ion exchange backfill is an anion exchange medium and a cation exchange medium.

55. A method as claimed in claim 51 wherein said radwaste is disposed in an underground site and said backfill surrounds said radwaste.

56. A method according to claim 51 wherein said ion exchange backfill comprises a porous silicate glass having interconnected pores and cationic ammonium organosiloxy groups bonded to silicon of the glass and/or anionic organosiloxy groups bonded to silicon of the glass on the internal surfaces of said pores.

57. Method as claimed in claim 56 wherein (a) said nonradioactive organosiloxy groups are ammonium organosiloxy groups; and (b) said non-radioactive anionic organosiloxy groups are oxycarbonylorganosiloxy groups; said non-radioactive anions are hydroxyl anions; and said non-radioactive cations are protons.

58. Method as claimed in claim 56 wherein said ammonium organosiloxy groups are represented by the formula:

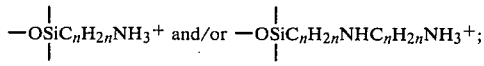

said oxycarbonylorganosiloxy groups are represented by the formula:

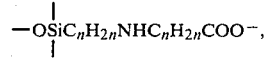

wherein in said formulas n is an integer of 1 to 18 and the unfilled valences of silicon in each formula are connected through oxygen to silicon of the glass, and/or is connected to a monovalent hydrocarbon group, and/or is connected through silicon to carbon linkages to additional $-C_nH_{2n}NH_3{}^+$, $-C_nH_{2n}NHC_nH_{2n}NH_3{}^+$ or $-C_nH_{2n}NHC_nH_{2n}COO^-$ groups.

59. Method as claimed in claim 58 wherein said ammonium organosiloxy groups are represented by the formula:

60. Method as claimed in claim 58 wherein said ammonium organosiloxy groups are represented by the formula:

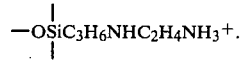

61. Method as claimed in claim 58 wherein said oxycarbonylorganosiloxy groups are represented by the formula:

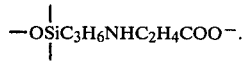

62. A method according to claim 51 wherein said ion exchange backfill includes a porous silicate glass having interconnected pores and non-radioactive cations selected from the group consisting of alkali metal cations, Group Ib metal cations and/or ammonium cations bonded to silicon through divalent oxygen linkages on the internal surfaces of said pores, said nonradioactive cations being capable of being displaced by said radioactive cations to provide a distribution of internal silicon-bonded radioactive cation oxy groups within the pores of said glass.

* * * * *